US012288545B2

(12) United States Patent
Tsuchiya et al.

(10) Patent No.: US 12,288,545 B2
(45) Date of Patent: Apr. 29, 2025

(54) ACOUSTIC SIGNAL PROCESSING DEVICE, ACOUSTIC SIGNAL PROCESSING METHOD, AND PROGRAM

(71) Applicant: Sony Group Corporation, Tokyo (JP)

(72) Inventors: Shinpei Tsuchiya, Saitama (JP); Kohei Asada, Kanagawa (JP); Yushi Yamabe, Tokyo (JP); Kyosuke Matsumoto, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 220 days.

(21) Appl. No.: 18/011,136

(22) PCT Filed: May 27, 2021

(86) PCT No.: PCT/JP2021/020229
§ 371 (c)(1),
(2) Date: Dec. 16, 2022

(87) PCT Pub. No.: WO2021/261165
PCT Pub. Date: Dec. 30, 2021

(65) Prior Publication Data

US 2023/0245640 A1 Aug. 3, 2023

(30) Foreign Application Priority Data

Jun. 24, 2020 (JP) ................................ 2020-108595

(51) Int. Cl.
*H04R 1/10* (2006.01)
*G10K 11/178* (2006.01)
(Continued)

(52) U.S. Cl.
CPC .. *G10K 11/17881* (2018.01); *G10K 11/17823* (2018.01); *G10K 11/17854* (2018.01);
(Continued)

(58) Field of Classification Search
CPC ...... G10K 2210/111; G10K 2210/1081; H04R 2410/01; H04R 1/1083
See application file for complete search history.

(56) References Cited

U.S. PATENT DOCUMENTS

| | | | |
|---|---|---|---|
| 10,665,220 | B1 | 5/2020 | Nielsen |
| 2014/0314245 | A1 | 10/2014 | Asada et al. |

(Continued)

FOREIGN PATENT DOCUMENTS

| | | | |
|---|---|---|---|
| JP | 2007-025918 | A | 2/2007 |
| JP | 2013-102370 | A | 5/2013 |

(Continued)

OTHER PUBLICATIONS

International Search Report and English translation thereof mailed Jul. 27, 2021 in connection with International Application No. PCT/JP2021/020229, 6 pages.

*Primary Examiner* — Ping Lee
(74) *Attorney, Agent, or Firm* — Wolf, Greenfield & Sacks, P.C.

(57) ABSTRACT

An acoustic signal processing device includes a noise canceling section that is provided for each of multiple microphones and that generates a signal for canceling noise according to a sound signal inputted from the corresponding microphone, and a digital filter that processes an external input signal.

13 Claims, 22 Drawing Sheets

(51) Int. Cl.
*H04R 3/00* (2006.01)
*H04S 7/00* (2006.01)

(52) U.S. Cl.
CPC ........... *H04R 1/1083* (2013.01); *H04R 3/005* (2013.01); *H04S 7/302* (2013.01); *G10K 2210/1081* (2013.01); *G10K 2210/111* (2013.01); *H04R 2410/01* (2013.01); *H04R 2460/01* (2013.01); *H04S 2400/15* (2013.01)

(56) References Cited

U.S. PATENT DOCUMENTS

| | | | | |
|---|---|---|---|---|
| 2015/0098571 | A1* | 4/2015 | Jarvinen | H04S 7/302 381/1 |
| 2016/0012816 | A1 | 1/2016 | Fujisawa | |
| 2018/0190260 | A1 | 7/2018 | Christoph | |
| 2018/0366099 | A1 | 12/2018 | Unruh | |
| 2018/0367937 | A1 | 12/2018 | Asada et al. | |

FOREIGN PATENT DOCUMENTS

| | | |
|---|---|---|
| JP | 2014-174430 A | 9/2014 |
| WO | WO 2017/061218 | 4/2017 |

* cited by examiner

1A

ACOUSTIC SIGNAL PROCESSING DEVICE, ACOUSTIC SIGNAL PROCESSING METHOD, AND PROGRAM

CROSS-REFERENCE TO RELATED APPLICATIONS

This application claims the benefit under 35 U.S.C. § 371 as a U.S. National Stage Entry of International Application No. PCT/JP2021/020229, filed in the Japanese Patent Office as a Receiving Office on May 27, 2021, which claims priority to Japanese Patent Application Number 2020-108595, filed in the Japanese Patent Office on Jun. 24, 2020, each of which is hereby incorporated by reference in its entirety.

TECHNICAL FIELD

The present disclosure relates to an acoustic signal processing device, an acoustic signal processing method, and a program.

BACKGROUND ART

A technology of canceling external noise when reproducing music or the like with a headset device, or a technology pertaining to what is called noise canceling has been known (for example, see PTL 1).

CITATION LIST

Patent Literature

[PTL 1]
Japanese Patent Laid-open No. 2007-25918

SUMMARY

Technical Problem

In this field, it has been desired that external noise that leaks into a headset device can be cancelled.

One object of the present disclosure is to provide an acoustic signal processing device, an acoustic signal processing method, and a program for effectively canceling noise.

Solution to Problem

For example, the present disclosure is an acoustic signal processing device including a noise cancelling section that is provided for each of multiple microphones and that generates a signal for cancelling noise according to a sound signal inputted from the corresponding microphone, and a digital filter that processes an external input signal.

For example, the present disclosure is an acoustic signal processing method including generating a signal for canceling noise according to a sound signal inputted from a corresponding one of multiple microphones, by a noise cancelling section that is provided for each of the microphones, and processing an external input signal, by a digital filter.

For example, the present disclosure is a program for causing a computer to perform an acoustic signal processing method, including generating a signal for canceling noise according to a sound signal inputted from a corresponding one of multiple microphones, by a noise cancelling section that is provided for each of the microphones, and processing an external input signal, by a digital filter.

BRIEF DESCRIPTION OF DRAWINGS

FIG. 11 is a diagram for explaining one example of a noise arrival direction to be searched for.

DESCRIPTION OF EMBODIMENTS

Hereinafter, embodiments for carrying out the present disclosure will be explained with reference to the drawings. It is to be noted that the explanation will be given in accordance with the following order.

<First embodiment>
<Second embodiment>
<Third embodiment>
<Modifications>

Embodiments etc. explained hereinbelow preferably exemplify the present disclosure. The present disclosure is not limited to these embodiments etc.

First Embodiment

<Summery>

First, in order to facilitate understanding of the present disclosure, the summery of the present embodiment will be explained wile problems to be taken into consideration in the present embodiment are explained.

In recent years, regarding music reproduction, headphone reproduction of 3D audio is attracting attention. Headphone reproduction of 3D audio giving more realistic feeling can be realized because reproducibility in a sound source arrival direction can be enhanced, compared to that in conventional stereo content reproduction. The reproduction accuracy of 3D audio is deteriorated due to masking by ambient noise if the ambient noise is large when the audio is being listened to. For this reason, reproduction using a digital noise canceling (hereinafter, referred to as DNC, as appropriate) technology is very effective.

Figure 1:
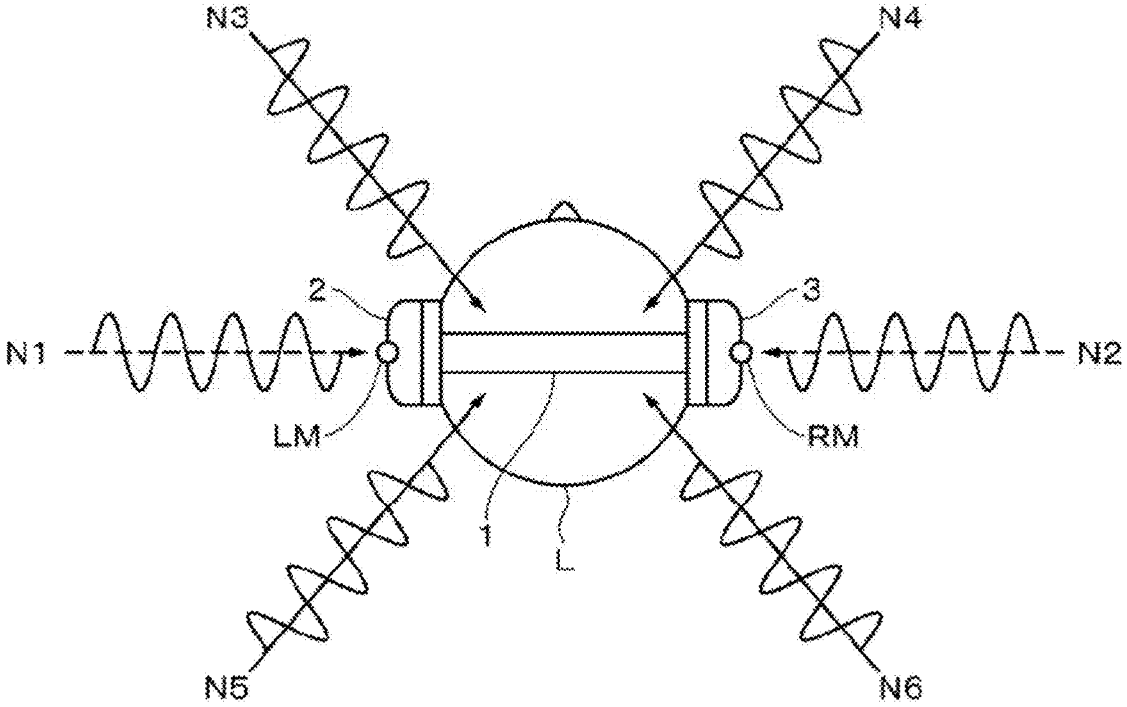
FIG. 1 is a diagram depicting a relation between a typical noise canceling headset and a noise arrival direction.

FIG. 1 is a diagram depicting a relation between a typical noise-canceling headset and noise arrival directions. In FIG. 1, a listener L is listening to 3D audio with a headset 1. Left and right housings 2 and 3 of the headset 1 are equipped with noise canceling microphones LM and RM, respectively. In FIG. 1, feedforward noise canceling (hereinafter, referred to as FFNC, as appropriate) is performed with use of one microphone for each ear. In FIG. 1, each sine wave shaped waveform and arrow schematically indicate noise that can intrude into the ears from the ambient environment of the headset 1.

In the case depicted in FIG. 1, the configuration in which one microphone is provided for each of the left and right sides, is highly effective against noises (e.g. noises N1 and N2 in FIG. 1) from the left and right sides. However, noises (e.g. noises N3 to N6 in FIG. 1) from the front and rear directions arrive at the inside of each ear before the microphones LM and RM complete collecting the noises and reproducing noise canceling signals. Therefore, noise cancelling using a proper reverse phase signal trough a noise canceling system cannot be performed. The noise cancelling effect in the front and rear directions is lower than that in the left and right directions. In particular, this impact becomes more significant at a higher frequency which has a shorter wavelength. Moreover, since actual noises arrive from any direction, the cancelling performance at a high frequency cannot be enhanced by general systems.

Figure 2:
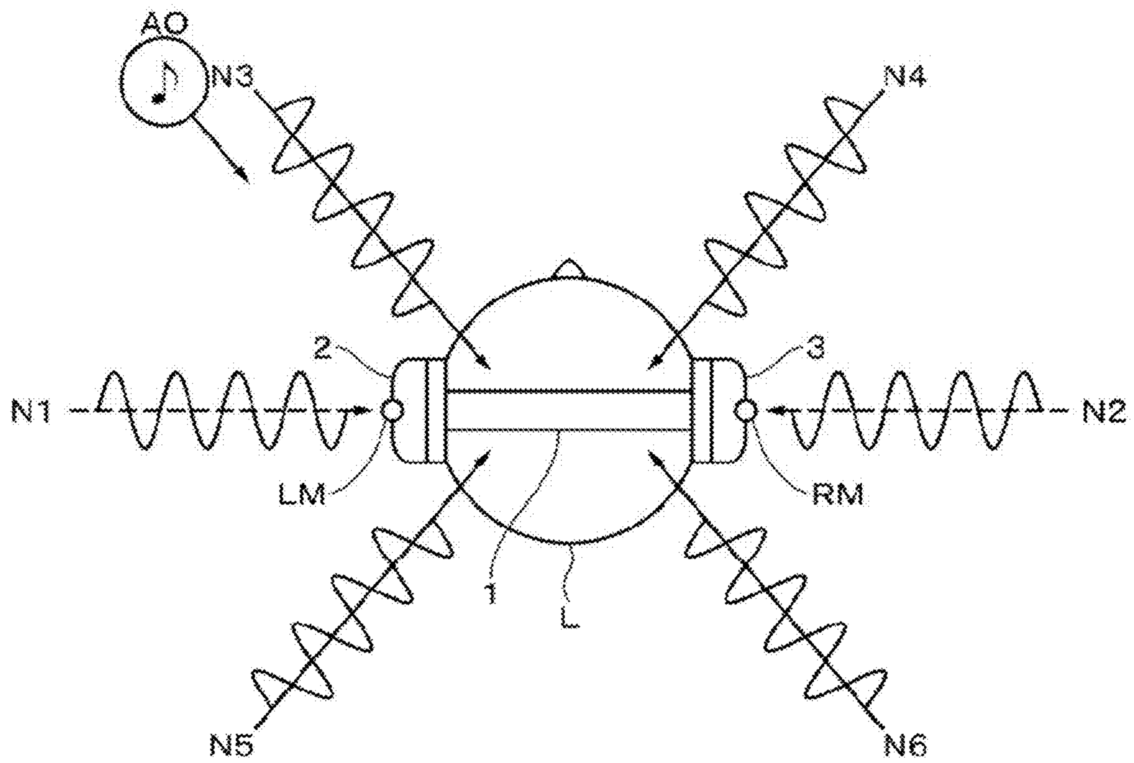
FIG. 2 is a diagram to be referred to when an explanation of problems to be taken into consideration in the present disclosure is given.
Figure 3:
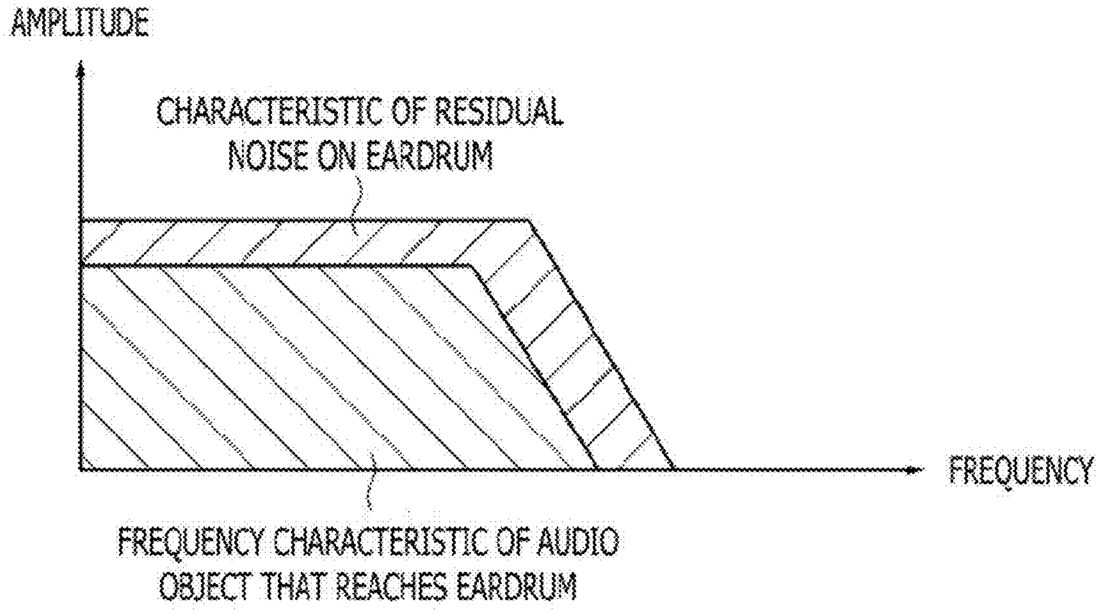
FIG. 3 is a diagram to be referred to when an explanation of a situation where a masking effect provided by noise deteriorates the reproducibility of 3D audio is given.

A case where 3D audio is reproduced by the system depicted in FIG. 1 is discussed here. As depicted in FIG. 2, when an audio object AO which has been processed so as to be localized at the front left side of the listener L is superimposed on a direction in which cancellation performance is low, the audio object AO is masked by noise, and thus, cannot be precisely perceived. In addition, in order to realize perception in three-dimensional directions, which is a feature of 3D audio, it is important to properly reproduce a head transmission characteristic, irrespective of whether an audio object AO is superimposed on a noise arrival direction. If a frequency characteristic which is a low noise canceling effect illustrated in FIG. 3 is provided and reproduction of a high-frequency range of an audio object AO to which a head transmission characteristic has been convoluted is affected by the ambient noise, the reproducibility of 3D audio is deteriorated due to a masking effect by the noise.

Figure 4:
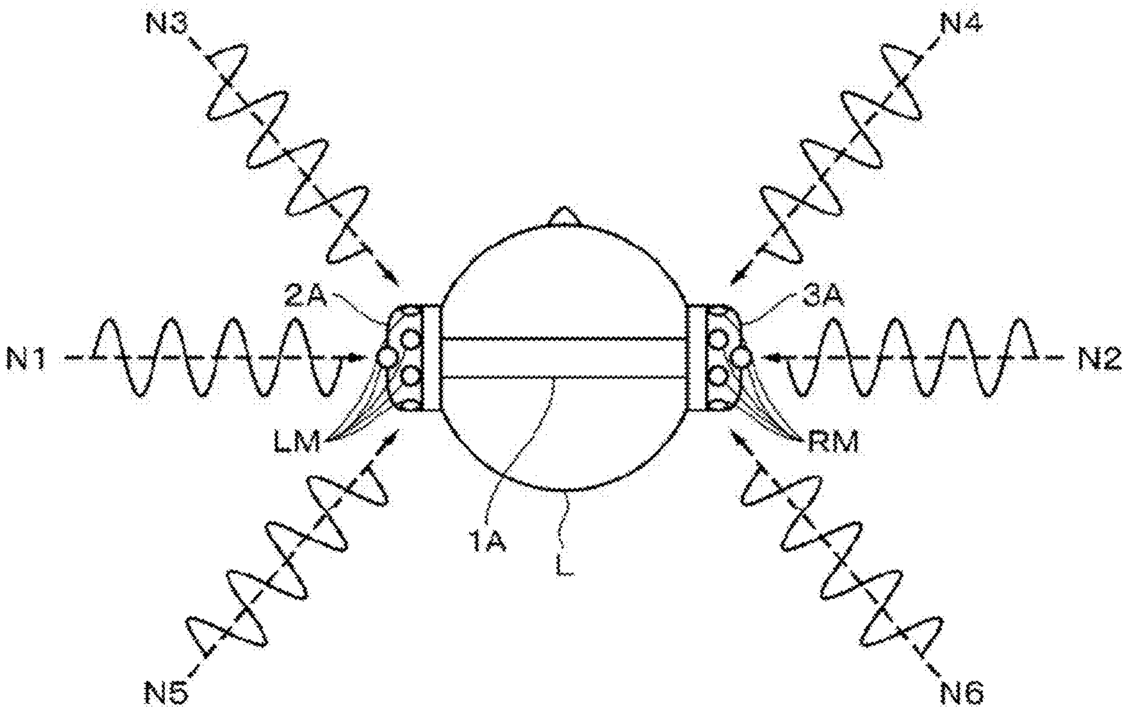
FIG. 4 is a diagram to be referred to when an explanation of the summery of an embodiment is given.

In view of the above problems, a headset 1A according to the present embodiment is equipped with multiple microphones LM in a left housing 2A and multiple microphones RM in a right housing 3A, as depicted in FIG. 4. The multiple microphones including feedback (FB) microphones that are disposed inside the housings (headset housings) collect the ambient noise, and generate noise cancelling signals by performing signal processing on the noise at DNC filter blocks. The generated noise canceling signals as well as audio signals are outputted from left and right headset drivers.

Figure 5:
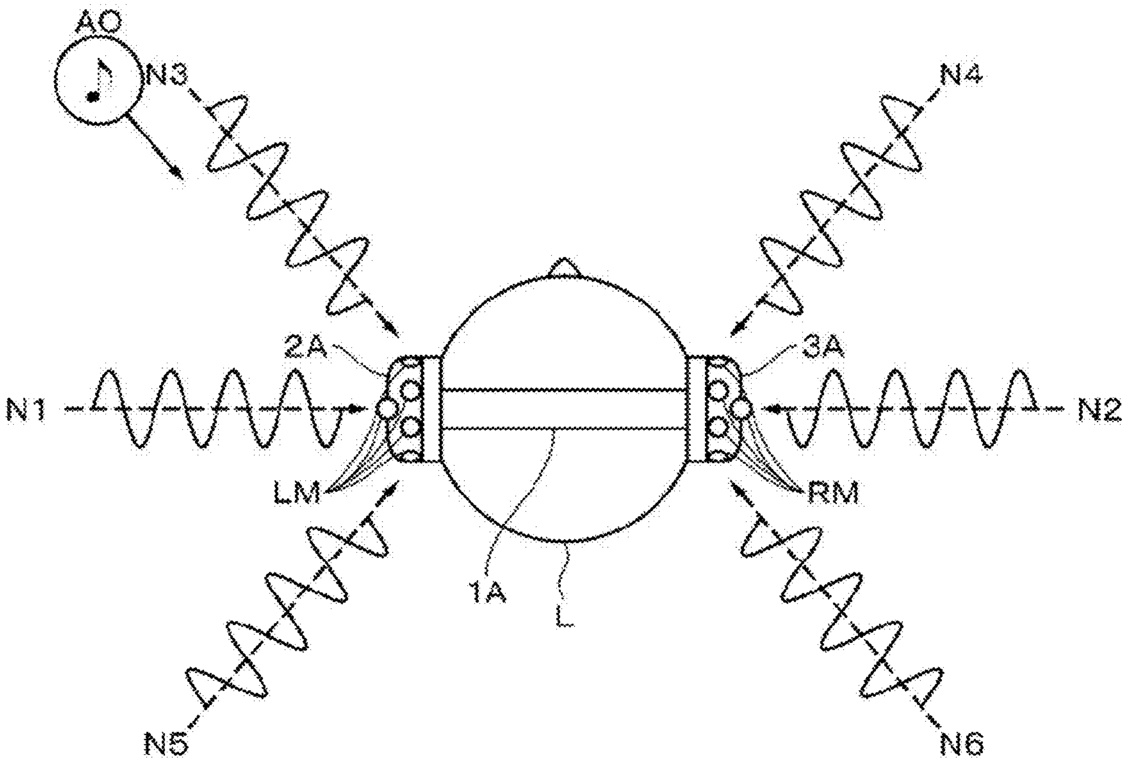
FIG. 5 is a diagram to be referred to when an explanation of the summery of an embodiment is given.

FIG. 5 is a diagram depicting a case where 3D audio is reproduced by a system to which multi-microphones FFNC which uses multiple microphones are applied. The multi-microphones FFNC system can handle noise directivity that has been a weak point for single-microphone FFNC which uses one microphone for each of left and right sides. Accordingly, even when noise arrives from any direction, the noise is collected by an FF microphone and a reverse phase signal is reproduced before the noise leaks into the ears, whereby leakage noise can be cancelled. Since noise from any direction can be robustly cancelled, the frequency band of the cancellation effect can be made higher.

Figure 6:
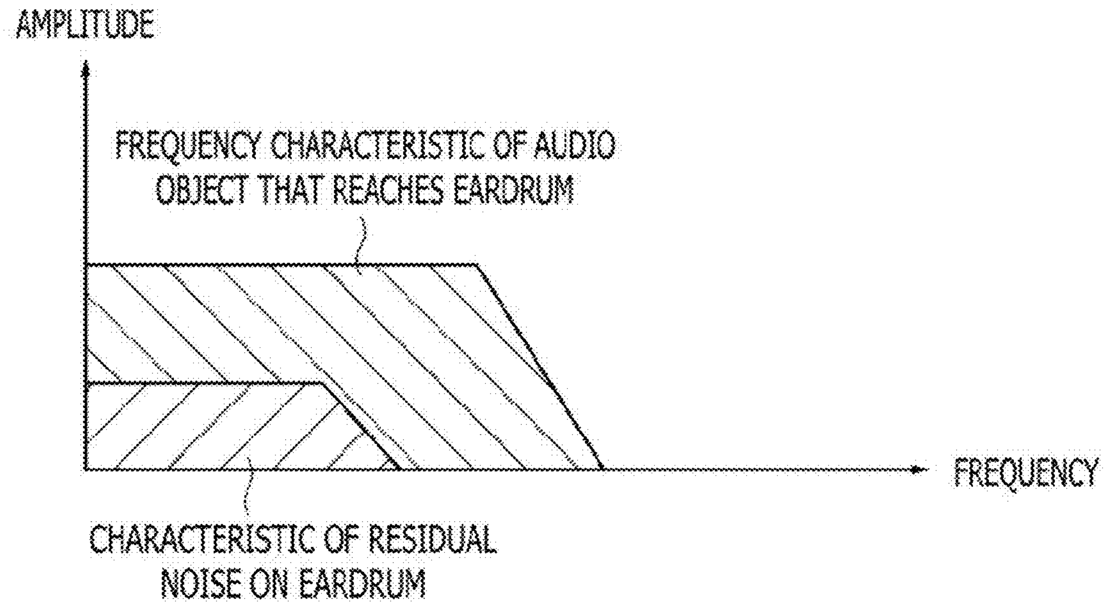
FIG. 6 is a diagram to be referred to when an explanation of the summery of an embodiment is given.

When 3D audio is reproduced by the multi-microphone FFNC, noise arrival directions can be robustly handled, as depicted in FIG. 6. Therefore, even if the arrangement position of an audio object AO is superimposed on a noise arrival direction, the influence of masking by the noise can be reduced so that the accuracy of reproducing the 3D audio is enhanced. It is to be noted that the present disclosure is effective for both monophonic type audio content and stereophonic type audio content.

<Configuration Example of Acoustic Signal Processing Device>

Figure 7:
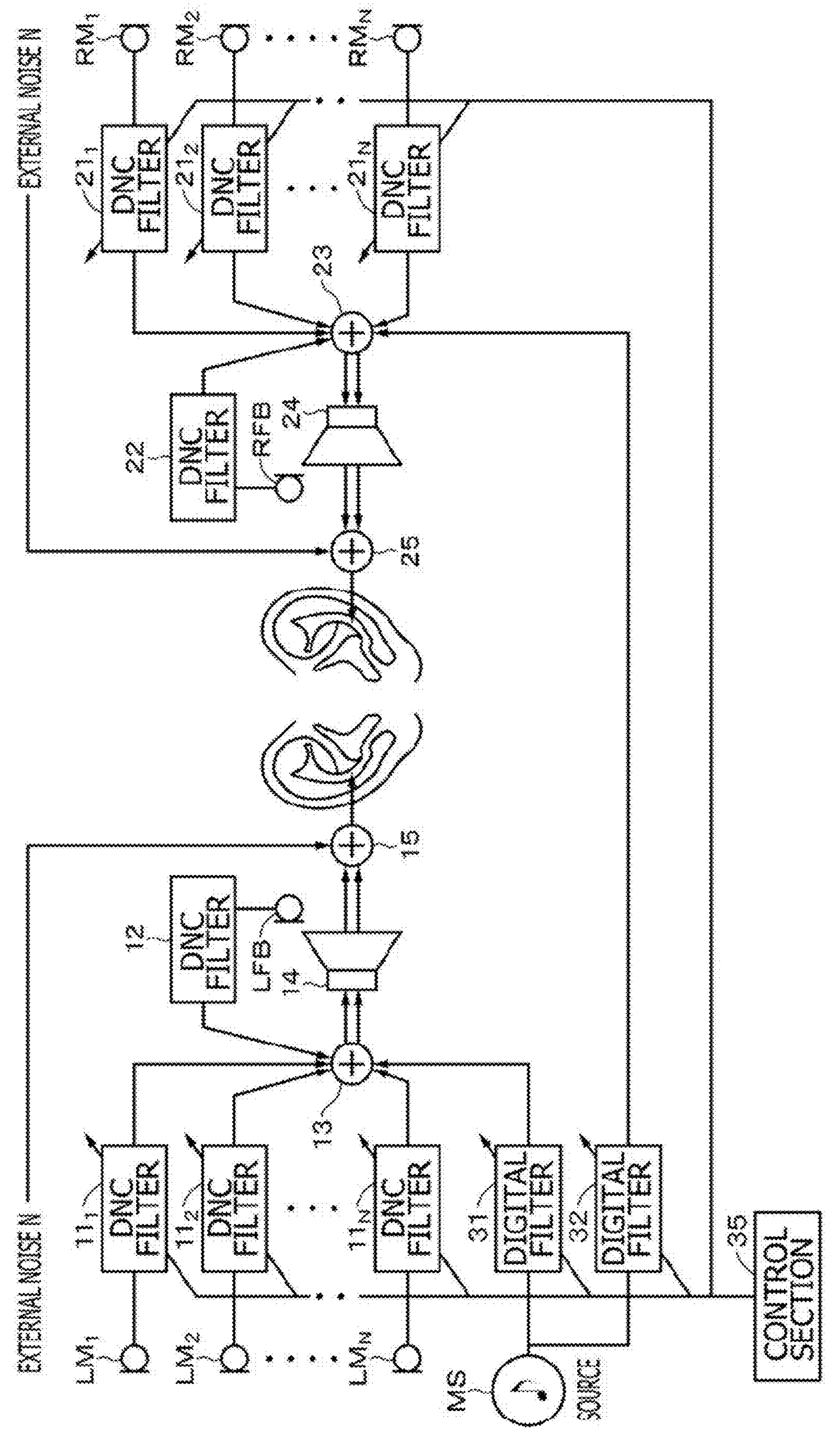
FIG. 7 is a diagram depicting a configuration example of a headset according to a first embodiment.

FIG. 7 is a diagram depicting a configuration example of an acoustic signal processing device according to the present embodiment. The acoustic signal processing device according to the present embodiment is formed as a headset 1A. The headset 1A includes microphones $LM_1$ to $LM_N$, DNC filters 11, a microphone LFB, a DNC filter 12, an adder section 13, a driver 14, an adder section 15, microphones $RM_1$ to $RM_N$, DNC filters 21, a microphone RFB, a DNC filter 22, an adder section 23, a driver 24, an adder section 25, a DNC filter 22, a digital filter 31, a digital filter 32, and a control section 35.

Audio data which is an external input signal is supplied to the headset 1A. The audio data is supplied wirelessly or wiredly. The audio data may be music data, or data including a speaker's voice only. The present embodiment will be explained on the assumption that the audio data is music data MS of 3D audio. It is to be noted that the music data MS may be monophonic type audio data or may be stereophonic type audio data. Further, the explanation will be given on the assumption that an external noise N can intrude into the headset 1A. For example, the external noise N is noise generated by a mobile body such as an airplane or a vehicle, or is noise generated by an air conditioner or the like.

The microphones $LM_1$ to $LM_N$ (N represents an optional natural number) are FFNC microphones, and are disposed in the left housing 2A of the headset 1A. It is to be noted that, in a case where it is not necessary to distinguish the microphones $LM_1$ to $LM_N$ from one another, the microphones are referred to as microphones LM, as appropriate. The number and arrangement positions of the microphones LM can be appropriately decided, but it is preferable to decide the number and positions in such a way that the external noise N that can intrude from the ambient environment of the listener L can be detected.

The DNC filters 11 include DNC filters 111 to 11N (N represents an optional natural number). The microphones LM are connected to the respective DNC filters 11. For example, the microphone $LM_1$ is connected to the DNC filter 111, and the microphone $LM_2$ is connected to the DNC filter 112.

When a sound outputted by the driver 14 arrives at an ear of the listener, the DNC filters 11 each cancel the external noise N, and generate a noise cancelling signal which has an effect of making only the sound of an audio signal audible to the listener. That is, each of the DNC filters 11 generates a noise cancelling signal which has a characteristic of a reversed phase of the external noise N (a sound signal collected by the corresponding microphone LM) that arrives at the ear of the listener. The DNC filters 11 output the generated noise cancelling signals to the adder section 13.

The DNC filters 11 are formed as FIR (Finite Impulse Response) filters or IIR (Infinite Impulse Response) filters, for example. In addition, in the present embodiment, the DNC filter 11 for use and a filter coefficient of the DNC filter 11 can be changed according to a control parameter generated by the control section 35.

The microphone LFB is a feedback microphone that is disposed in the housing 2A. The microphone LFB is disposed near the driver 14.

The DNC filter 12 generates a noise cancelling signal for cancelling the external noise N on the basis of a sound signal inputted to the microphone LFB. The DNC filter 12 is formed as an FIR filter or an IIR filters, for example. In addition, a filter coefficient of the DNC filter 12 may be changed according to a control parameter generated by the control section 35, although the filter coefficient is fixed in the present embodiment.

The adder section 13 adds up the noise cancelling signals generated by the DNC filters 11, the noise cancelling signal generated by the DNC filter 12, and the music data MS processed by the digital filter 31. The resultant signal is supplied to the driver 14.

The driver 14 outputs the music data MS and the noise cancelling signal supplied from the adder section 13. The signal outputted from the driver 14 is supplied to the adder section 15.

The adder section 15 adds up the music data MS, the noise cancelling signal, and the external noise N. Accordingly, the music data MS in which the external noise N has been cancelled arrives at the left ear of the listener.

The microphones $RM_1$ to $RM_N$ (N represents an optional natural number) are FFNC microphones, and are disposed in the right housing 3A of the headset 1A. It is to be noted that, in a case where it is not necessary to distinguish the microphones $RM_1$ to $RM_N$ from one another, the microphones are referred to as microphones RM, as appropriate. The number and arrangement positions of the microphones RM may be appropriately decided, but it is preferable to decide the number and positions in such a way that external noise N that can intrude from the ambient environment of the listener L can be detected.

The DNC filters 21 include DNC filters 211 to 21N (N represents an optional natural number). The microphones RM are connected to the respective DNC filters 21. For example, the microphone $RM_1$ is connected to the DNC filter 211, and the microphone $RM_2$ is connected to the DNC filter 212.

When a sound outputted by the driver 24 arrives at an ear of the listener, the DNC filters 21 each cancel the external noise N, and generate a noise cancelling signal which has an effect of making only the sound of an audio signal audible to the listener. That is, each of the DNC filters 21 generates a noise cancelling signal which has a characteristic of a reversed phase of the external noise N (a sound signal collected by the corresponding microphone RM) that arrives at the ear of the listener. The DNC filters 21 output the generated noise cancelling signals to the adder section 23.

The DNC filters 21 are formed as FIR filters or IIR filters, for example. In addition, in the present embodiment, the DNC filter 21 for use and a filter coefficient of the DNC filter 21 can be changed according to a control parameter generated by the control section 35.

The microphone LRB is a feedback microphone that is disposed in the housing 3A. The microphone RFB is disposed near the driver 24.

The DNC filter 22 generates a noise cancelling signal for cancelling the external noise N on the basis of a sound signal inputted to the microphone RFB. The DNC filter 22 is formed as an FIR filter or an IIR filter, for example. In addition, a filter coefficient of the DNC filters 22 may be changed according to a control parameter created by the control section 35, although the filter coefficient is fixed in the present embodiment.

The adder section 23 adds up the noise cancelling signals generated by the DNC filters 21, the noise cancelling signal generated by the DNC filter 22, and the music data MS processed by the digital filter 32. The resultant signal is supplied to the driver 24.

The driver 24 outputs the music data MS and the noise cancelling signal supplied from the adder section 23. A signal outputted from the driver 24 is supplied to the adder section 25.

The adder section 25 adds up the music data MS, the noise cancelling signal, and the external noise N. Accordingly, the music data MS in which the external noise N has been cancelled arrives at the right ear of the listener.

The digital filters 31 and 32 each process an external input signal (the music data MS in the present embodiment). The digital filters 31 and 32 each have an equalizing function of changing a frequency characteristic of the music data MS that has been converted to a digital form by an A/D (Analog to Digital) conversion section (not illustrated), and a rendering function of localizing an audio object at a prescribed position by controlling a delay or the phase of the audio object, as appropriate, for example. The filter characteristics such as filter coefficients of the digital filters 31 and 32 are defined by control parameters from the control section 35.

The control section 35 controls operations of the DNC filters 11 and 21 by generating and supplying control parameters for the DNC filters 11 and 21. In addition, the control section 35 controls operations of the digital filters 31 and 32 by generating and supplying control parameters for the digital filters 31 and 32.

In the present embodiment, the microphones LM, the microphone LFB, the microphones RM, and the microphone RFB serve as multiple microphones. Further, the DNC filters 11 and 12 and the DNC filters 21 and 22 serve as the noise cancelling section that is provided for each of the microphones, and that generates a signal for canceling noise according to an input sound signal collected by the corresponding microphone. It is to be noted that the headset 1A may include a gain adjustment section (not depicted) for adjusting the volume of a sound, for example.

<Operation Example of Headset>

Next, an operation example of the headset 1A will be explained. The DNC filters 11 generate noise cancelling signals for canceling the external noise N according to input sound signals collected by the microphones LM. The DNC filters 21 generate noise cancelling signals for canceling the external noise N according to input sound signals collected by the microphones RM.

The noise cancelling signals are added to the music data MS. As a result, the external noise N is cancelled. Accordingly, a sound corresponding to the music data MS in which the external noise N has been canceled is reproduced to the listener.

According to the first embodiment explained so far, multiple microphones are disposed in housings of a headset. Consequently, noise that arrives from any direction can be effectively cancelled.

Second Embodiment

Next, a second embodiment will be explained. It is to be noted that, in the explanation of the second embodiment, a section that is identical or similar to that in the above explanation is denoted by the same reference numeral, and a repeated explanation thereof will be omitted, as appropriate. In addition, a matter having been explained in the first embodiment may be applied to the second embodiment unless otherwise stated.

<Summery>

Figure 8A:
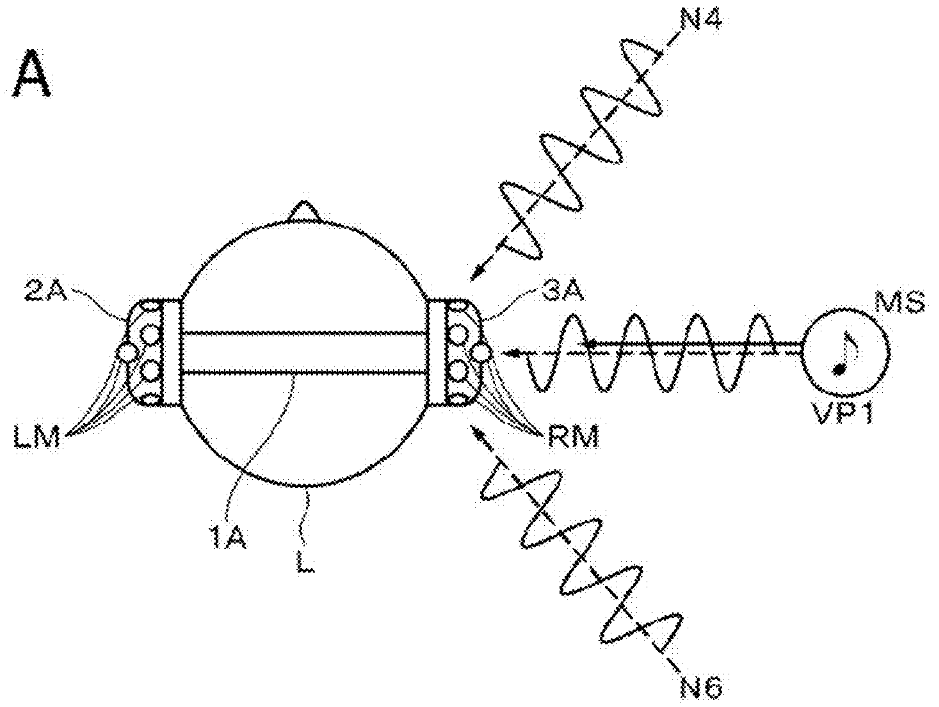
FIGS. 8A and 8B are diagrams for explaining the summery of a second embodiment.
Figure 8B:
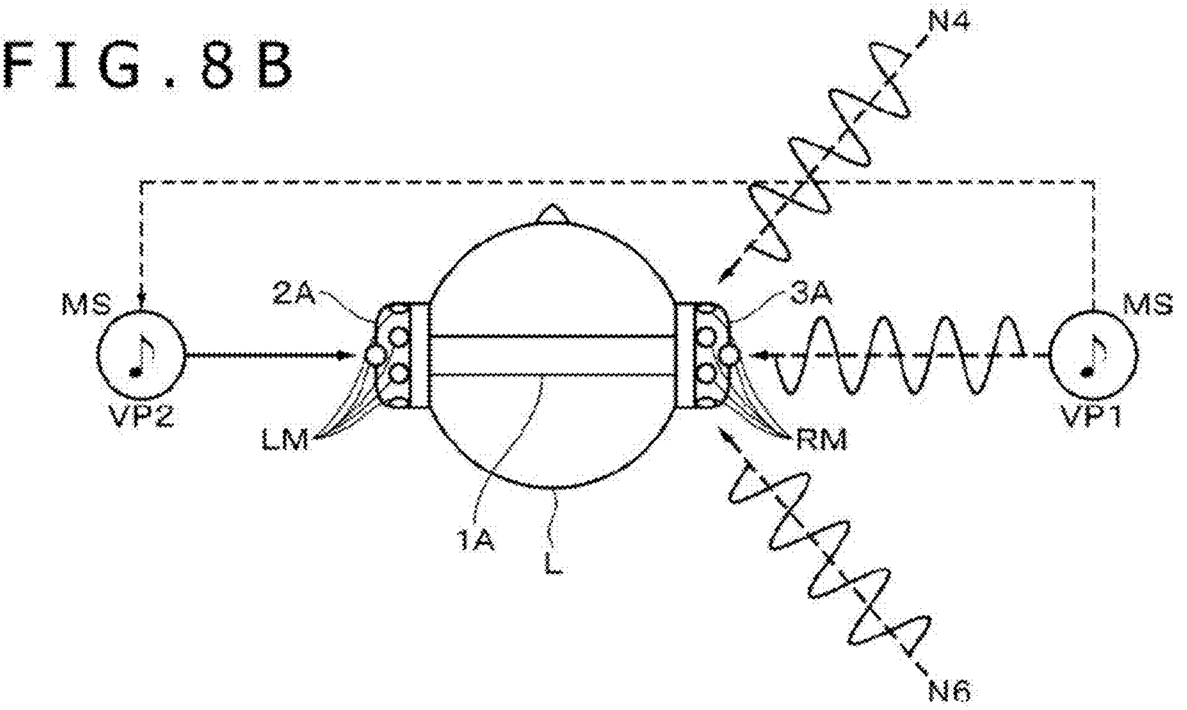

FIGS. 8A and 8B are diagrams for explaining the summery of the second embodiment. For example, a case where external noise N that arrives at the listener L from the right side is dominant, as depicted in FIG. 8A, will be discussed. The music data MS is 3D audio content. A prescribed audio object is localized at a prescribed position VP1 on the right side of the listener L. In this case, since the localized position of the audio object or the sound source direction is identical to the noise arrival direction, the clarity and sense of localization of a reproduced sound may be degraded. To this end, the sound source direction is dynamically changed in the present embodiment. Specifically, as schematically depicted in FIG. 8B, a position at which the music data MS is to be localized is changed to a position VP2 in a direction in which there is little noise, whereby the clarity and sense of localization of a reproduced sound are improved. Hereinafter, the details of the present embodiment will be explained.

<Configuration Example of Headset>

(Overall Configuration Example)

Figure 9:
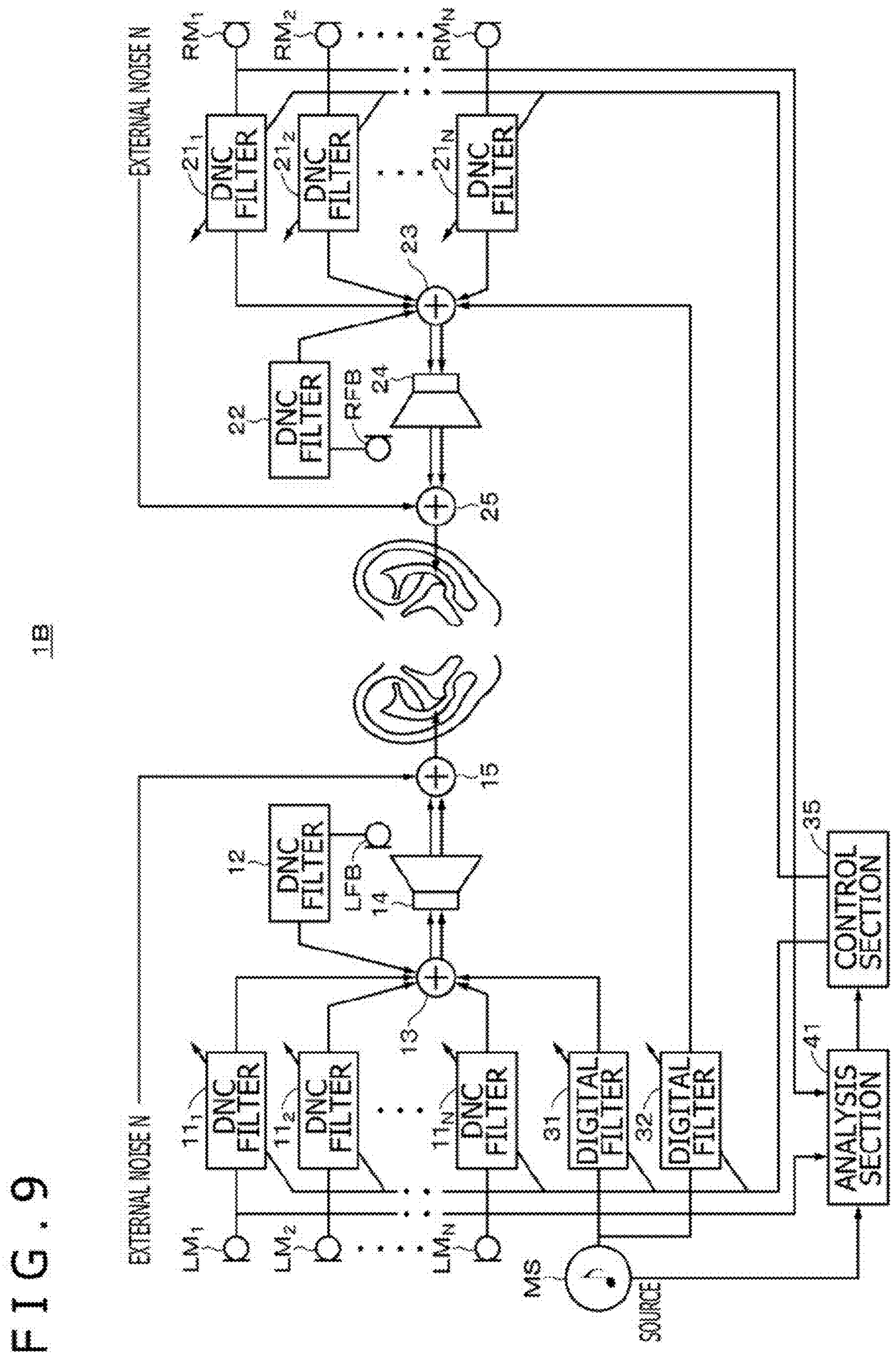
FIG. 9 is a diagram depicting a configuration example of a headset according to the second embodiment.

FIG. 9 is a diagram depicting a configuration example of a headset (headset 1B) according to the second embodiment. The headset 1B has a configuration difference from the headset 1A according to the first embodiment in that the headset 1B includes an analysis section 41 that is connected to the control section 35. Sound signals collected by the microphones LM, sound signals collected by the microphones RM and the music data MS are supplied to the analysis section 41. The analysis section 41 analyzes the sound signals supplied from the microphones LM and RM, and the external input signal.

(Configuration Example of Analysis Section)

Figure 10:
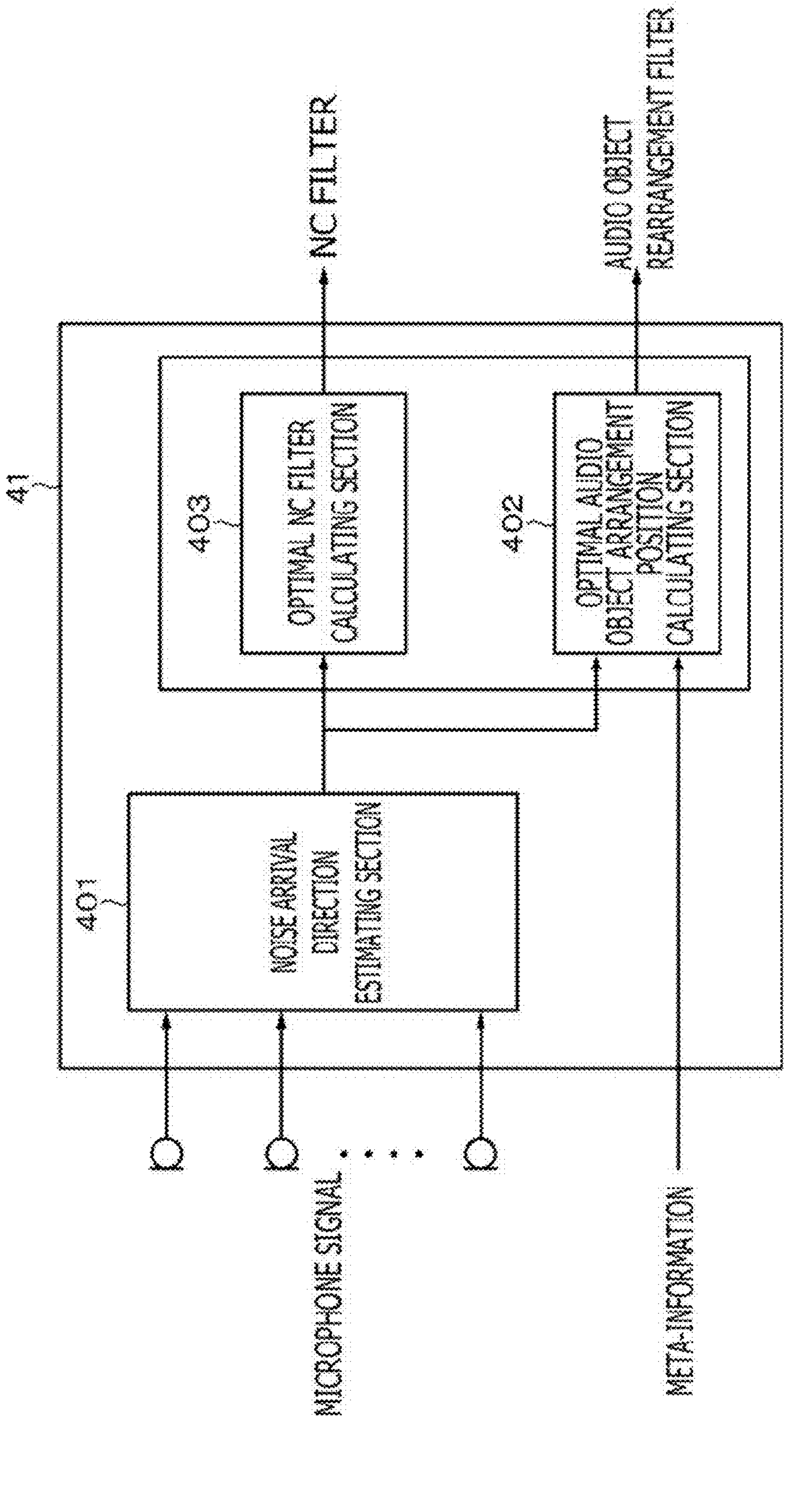
FIG. 10 is a diagram depicting a configuration example of an analysis section according to the second embodiment.

FIG. 10 is a diagram depicting a configuration example of the analysis section 41. The analysis section 41 includes a noise arrival direction estimating section 401, an optimal audio object arrangement position calculating section 402, and an optimal NC filter calculating section 403, for example.

Sound signals corresponding to the external noise N collected by the microphones LM and the microphones RM are inputted to the noise arrival direction estimating section 401. On the basis of the inputted sound signals, the noise arrival direction estimating section 401 generates noise arrival direction information which indicates the arrival direction of the noise. Specifically, the noise arrival direction information is indexes indicating the respective noise intensities in multiple directions. The noise arrival direction information is supplied to both the optimal audio object arrangement position calculating section 402 and the optimal NC filter calculating section 403.

The optimal audio object arrangement position calculating section 402 calculates an optimal arrangement position of an audio object in accordance with the noise arrival direction information. The optimal audio object arrangement position calculating section 402 calculates the optimal arrangement position of the audio object by additionally referring to information written in meta information corresponding to the audio object. The manner of referring to the information will be explained in detail later.

The optimal NC filter calculating section 403 calculates optimal control parameters for the DNC filters 11 and 21 in accordance with the noise arrival direction information. Thereafter, the optimal NC filter calculating section 403 outputs the calculation result to the control section 35.

(Noise Arrival Direction Estimating Section)

Figure 11:
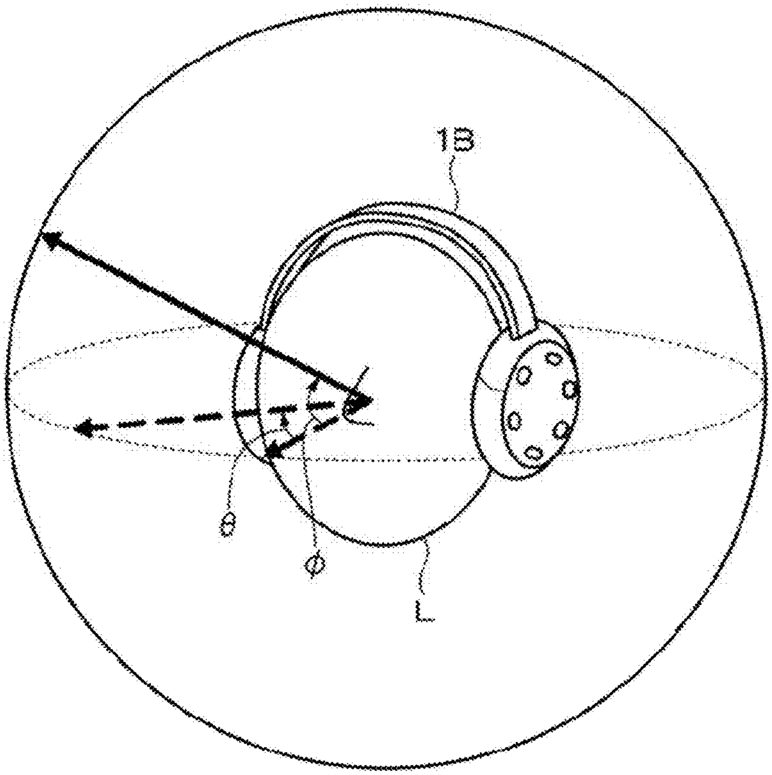

Next, a specific example of a process that is performed by the noise arrival direction estimating section 401 will be explained. FIG. 11 is a diagram for explaining one example of a noise arrival direction to be searched for. As depicted in FIG. 11, a horizontal angle $\theta$ and an elevation angle $\varphi$ are defined with respect to the listener L using the headset 1B. The noise arrival direction estimating section 401 calculates a noise intensity for each direction in three dimensions while changing the horizontal angle $\theta$ and the elevation angle $\varphi$, and generates noise arrival direction information on the basis of the calculation result.

Figure 12:
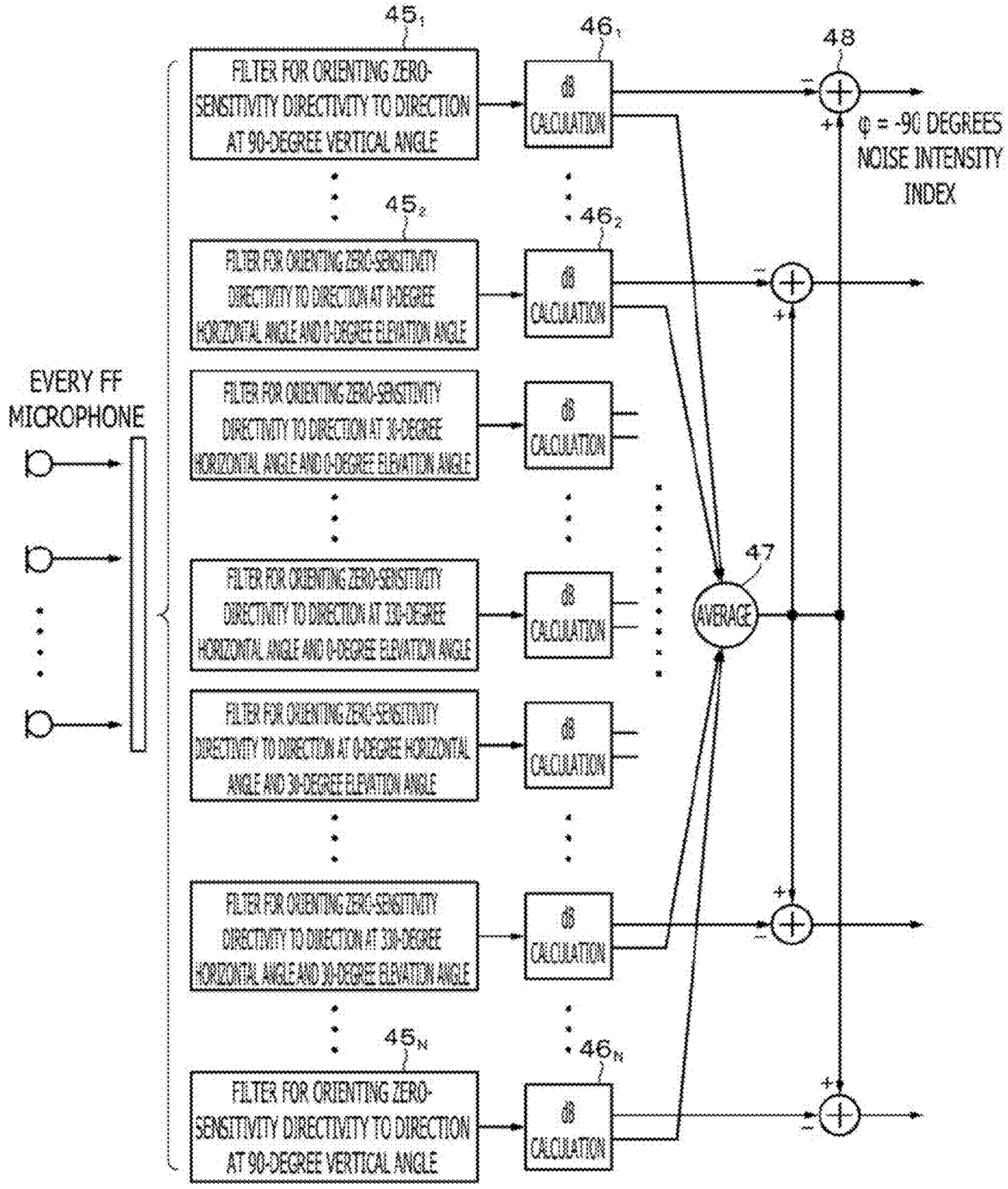
FIG. 12 is a diagram depicting a specific configuration example of a noise arrival direction estimating section.

FIG. 12 is a diagram depicting a specific configuration example of the noise arrival direction estimating section 401. The noise arrival direction estimating section 401 includes filters 45 (filters $45_1$ to $45_N$ (N represents a natural number)) for three-dimensional directions. For example, the filter $45_1$ orients a zero-sensitivity directivity to a direction at a 90-degree vertical angle. The filter $45_2$ orients a zero-sensitivity directivity to a direction at a 0-degree horizontal angle and a 0-degree elevation angle. The filter $45_3$ orients a zero-sensitivity directivity to a direction at a 30-degree horizontal angle and a 0-degree elevation angle. Sound signals collected by the microphones LM and the microphones RM are inputted to the filters constituting the filters 45.

Outputs from the filters 45 are supplied to respective dB calculation sections 46. The dB calculation sections 46 each calculate the level (dB) of the inputted sound signal. The calculation results obtained by the filters are supplied to an average value calculating section 47. The average value calculating section 47 calculates an average value of the calculation results. Thereafter, the difference from the average value is computed by the adder section 48, and the computation result is used as a noise intensity in a three-dimensional direction corresponding to the prescribed filter. For example, an output from the filter $45_1$ is supplied to the dB calculation section $46_1$. A calculation result obtained by the dB calculation section $46_1$ is supplied to the average value calculating section 47 and the adder section 48. The adder section 48 calculates the difference between the output from the dB calculation section $46_1$ and the output from the average value calculating section 47. An output from the adder section 48 is used as a noise intensity index in a direction corresponding to the filter $45_1$, that is, φ=90 degrees. In this manner, noise intensity indexes corresponding to respective three-dimensional directions are obtained.

Figure 13:
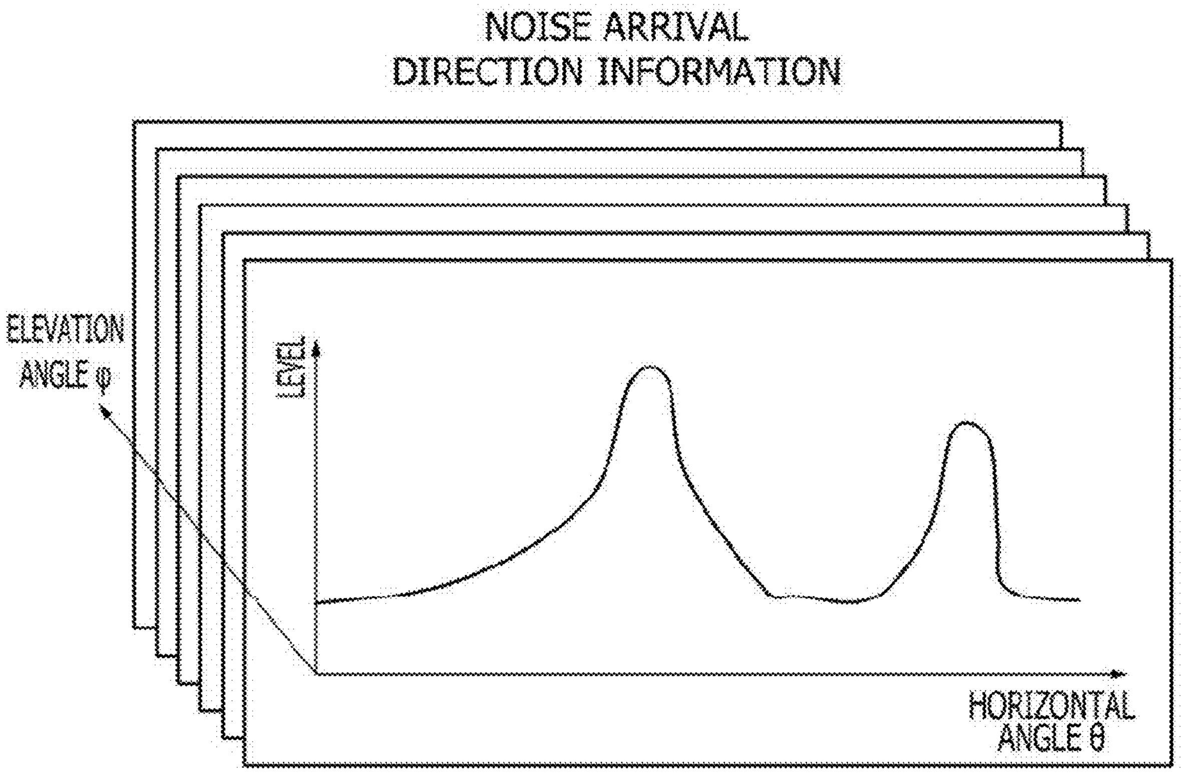
FIG. 13 is a diagram depicting one example of noise arrival direction information.

The noise arrival direction estimating section 401 generates noise arrival direction information on the basis of the obtained noise intensity indexes. FIG. 13 is a diagram depicting one example of the noise arrival direction information. As depicted in FIG. 13, a noise level corresponding to a prescribed horizontal angle θ and a prescribed elevation angle φ is defined in the noise arrival direction information.

(Optimal Audio Object Arrangement Position Calculating Section)

Figure 14:
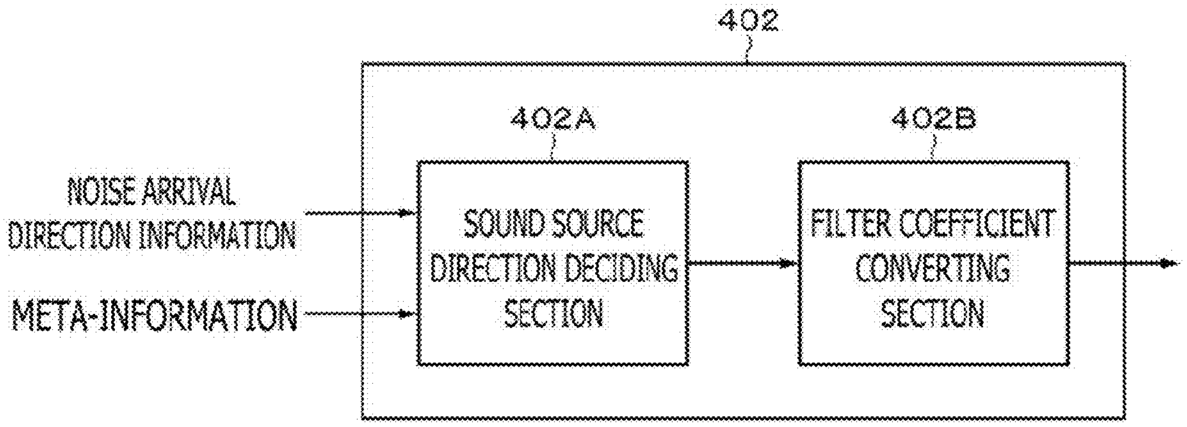
FIG. 14 is a diagram depicting a specific configuration example of an optimal audio object arrangement position calculating section.

As depicted in FIG. 14, the optimal audio object arrangement position calculating section 402 includes a sound source direction deciding section 402A and a filter coefficient converting section 402B.

The sound source direction deciding section 402A decides a direction to which an audio object is to be localized, that is, a sound source direction in accordance with the noise arrival direction information. The sound source direction may be defined by a specific three-dimensional position, or may be defined by a direction with respect to the listener L. The sound source direction deciding section 402A supplies the decided sound source direction to the filter coefficient converting section 402B.

The filter coefficient converting section 402B converts the sound source direction decided by the sound source direction deciding section 402A to a filter coefficient by performing a conversion process on the sound source direction. For example, the filter coefficient converting section 402B holds, in a table, filter coefficients corresponding to multiple sound source directions. The filter coefficient converting section 402B reads out, from the table, a filter coefficient corresponding to the sound source direction supplied from the sound source direction deciding section 402A. Thereafter, the filter coefficient converting section 402B supplies the read filter coefficient to the control section 35. The control section 35 defines the filter coefficient as a control parameter for the digital filter 31 and 32. Accordingly, an audio object is localized in a sound source direction decided by the optimal audio object arrangement position calculating section 402.

Figure 15:
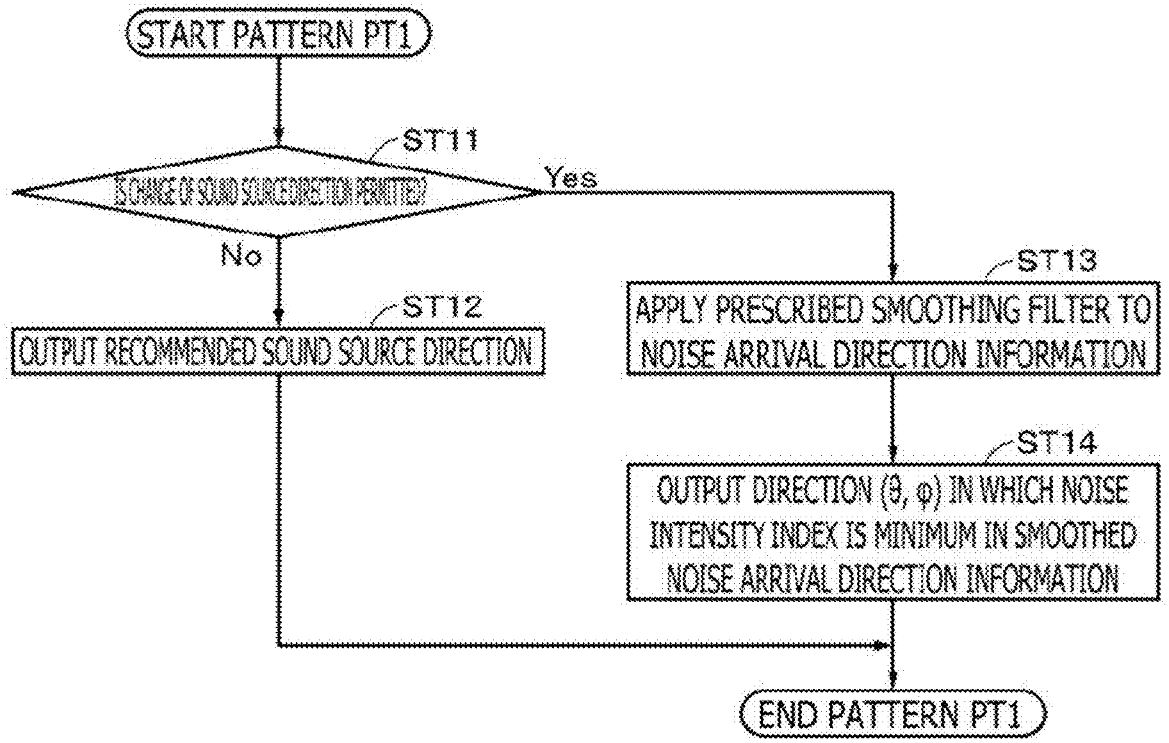
FIG. 15 is a flowchart for explaining a first example of a sound source deciding process that is performed by a sound source direction deciding section.

Hereinafter, some examples of a sound source deciding process that is performed by the sound source direction deciding section 402A will be explained. FIG. 15 is a flowchart for explaining a first example of the sound source deciding process that is performed by the sound source direction deciding section 402A. In the first example (pattern PT1), a single audio object is reproduced. Meta information corresponding to the audio object includes an identification number of the audio object, a recommended sound source direction for reproducing the audio object (recommended reproduction position information), and change permission/prohibition information indicating whether a change of the sound source direction from the recommended reproduction position information is permitted or not.

At step ST11, the sound source direction deciding section 402A determines whether or not a change of the sound source direction is permitted on the basis of the change permission/prohibition information included in the meta information. In a case where the determination result is No, the process proceeds to step ST12.

At step ST12, the sound source direction deciding section 402A outputs the recommended sound source direction to the filter coefficient converting section 402B because a change of the sound source direction is not permitted. As a result, the audio object is reproduced in the recommended sound source direction. Then, the process is finished.

In a case where the determination result of step ST13 is Yes, the process proceeds to step ST13. At step ST13, a computation of convoluting a prescribed smoothing filter into the noise arrival direction information is performed. Then, the process proceeds to step ST14.

At step ST14, the sound source direction deciding section 402A outputs a direction (θ, φ) in which the noise intensity index is minimized in accordance with the smoothed noise arrival direction information. As a result, the audio object is reproduced in the direction (θ, φ) in which the noise intensity index is minimized. Then, the process is finished.

It is to be noted that the computation for convoluting the smoothing filter at step ST13 may be omitted.

Figure 16:
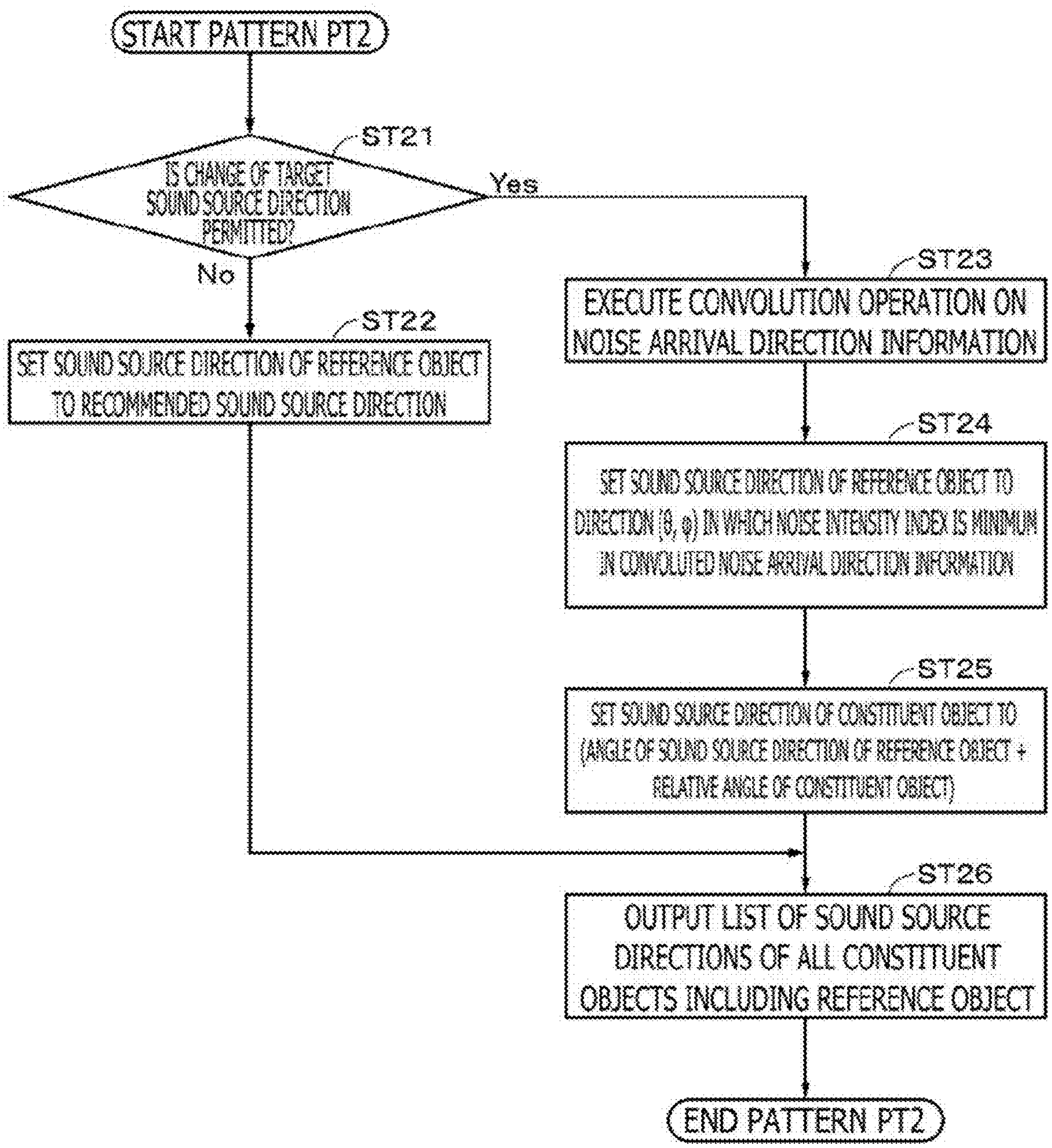
FIG. 16 is a flowchart for explaining a second example of the sound source deciding process that is performed by the sound source direction deciding section.

FIG. 16 is a flowchart for explaining a second example of the sound source deciding process that is performed by the sound source direction deciding section 402A. In the second example (pattern PT2), multiple audio objects the relative positions of which have been defined are reproduced.

Meta information includes an identification number for identifying an audio object group, recommended reproduction position information regarding a reference audio object (abbreviated as reference object, as appropriate), change permission/prohibition information, and a list of constituent audio objects that belong to the same group. The list of constituent audio objects includes identification numbers for identifying respective constituent audio objects (also referred to as constituent objects), and relative sound source directions (relative angles with respect to the reproduction position of the reference object) of the constituent audio objects.

At step ST21, the sound source direction deciding section 402A determines whether a change of a sound source direction is permitted or not for the audio object group on the basis of the change permission/prohibition information included in the meta information. In a case where the determination result is No, the process proceeds to step ST22.

At step ST22, a sound source direction of the reference object is set to the sound source direction indicated by the recommended reproduction position information. Then, the process proceeds to step ST26.

The relative sound source directions of the constituent objects are described in the meta information. When the sound source direction of the reference object is set, the sound source direction of each constituent object also can be determined. Therefore, at step ST26, the sound source direction deciding section 402A outputs a list of the sound source directions of the reference object and all the constituent objects. The reference object and the constituent objects are reproduced in the respective sound source directions indicated by the list. Then, the process is finished.

Figure 17A:
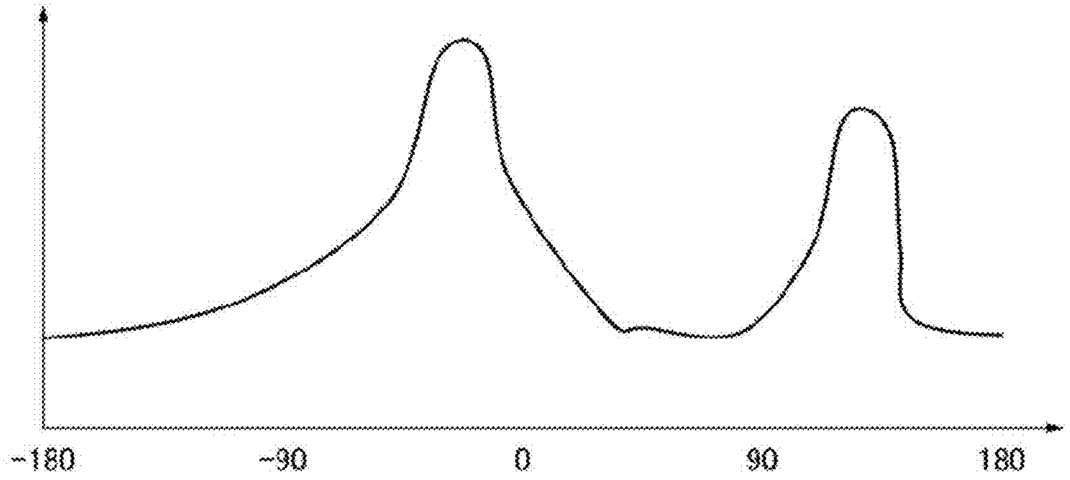
FIGS. 17A and 17B are diagrams to be referred to when the second example of the sound source deciding process that is performed by the sound source direction deciding section is explained.
Figure 17B:
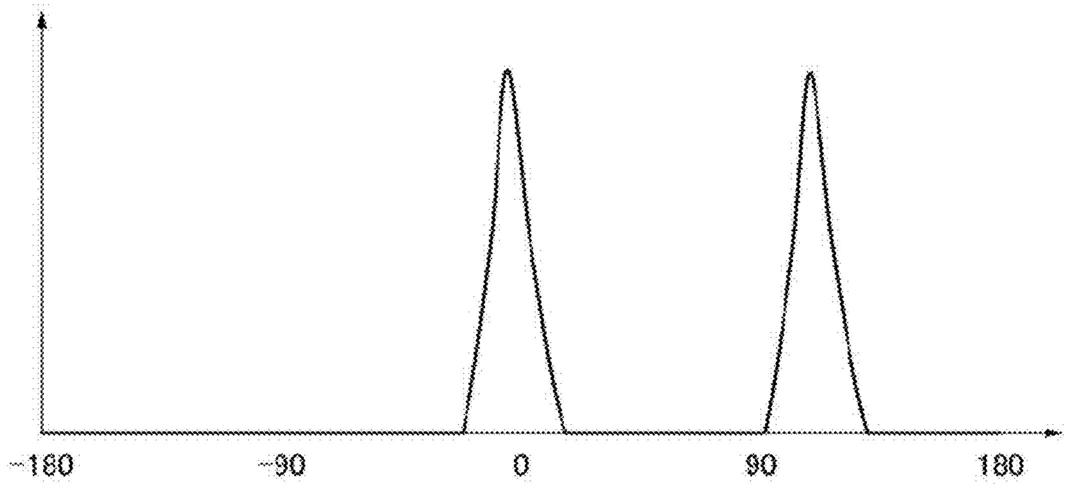

In a case where the determination result of step ST21 is Yes, the process proceeds to step ST23. At step ST23, a convolution computation is performed on the noise arrival direction information. For example, FIG. 17A depicts one example of the noise arrival direction information. In a case where the relative sound source direction (θ, φ) of a constituent object with respect to the reference object is (120, 0), a smoothing comb filter as depicted in FIG. 17B is prepared. The smoothing comb filter is a two-dimensional filter having a positive value only around an angle of the relative sound source object of the constituent object. This two-dimensional filter is circulation-convoluted into the noise arrival direction information. Then, the process proceeds to step ST24.

At step ST24, the sound source direction deciding section 402A sets the sound source direction of the reference object to a direction (θ, φ) in which the noise intensity index is minimized in the noise arrival direction information obtained by the computation. Then, the process proceeds to step ST25.

Since the sound source direction of the reference object has been set, the sound source direction of each constituent object is set to (the angle of the sound source direction of the reference object+the relative angle of the constituent object) at step ST25. Then, the process proceeds to step ST26.

At step ST26, the sound source direction deciding section 402A outputs a list of the sound source directions of the reference object and all the constituent objects. The reference object and the constituent objects are reproduced in the respective sound source directions indicated by the list. Then, the process is finished.

Figure 18:
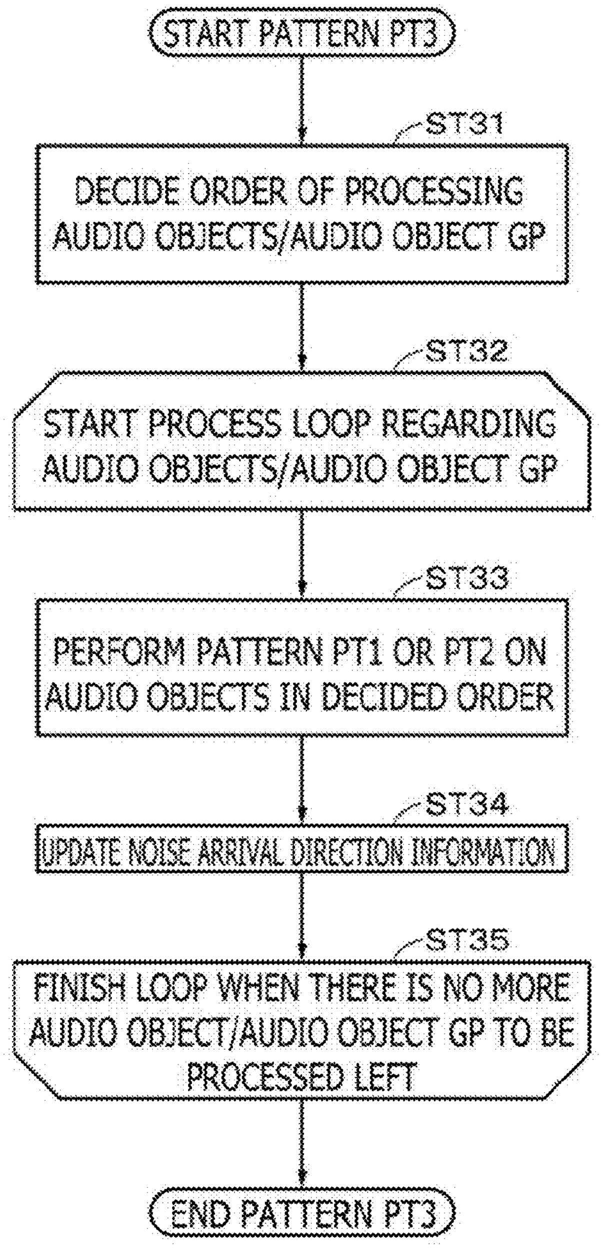
FIG. 18 is a flowchart for explaining a third example of the sound source deciding process that is performed by the sound source direction deciding section.

FIG. 18 is a flowchart for explaining a third example of the sound source deciding process that is performed by the sound source direction deciding section 402A. In the third example (pattern PT3), multiple audio objects are arranged.

The order of the multiple audio objects is defined. The order may be randomly decided, or may be based on the importance of each audio object. The importance of an audio object which is human voice is high while the importance of an audio object which is BGM is low, for example. Alternatively, if content classification is described in the meta information, the order may be based on the content classification. For example, the audio objects may be sorted in accordance with a priority order that is previously defined for each content classification.

At step ST31, the sound source direction deciding section 402A decides the order of processing the audio objects or audio object groups (hereinafter, abbreviated as audio objects etc., as appropriate). Then, the process proceeds to step ST32.

At step ST32, a process loop regarding the audio objects etc. is started. Then, the process proceeds to step ST33.

At step ST33, the sound source direction deciding section 402A performs the process regarding the abovementioned pattern PT1 or PT2 on the audio objects etc. in accordance with an order corresponding to the decided order. Then, the process proceeds to step ST34.

Figure 19A:
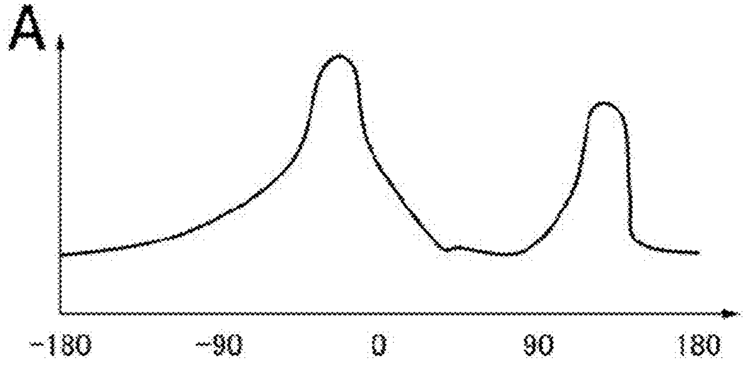
FIGS. 19A to 19D are diagrams to be referred to when the third example of the sound source deciding process that is performed by the sound source direction deciding section is explained.
Figure 19B:
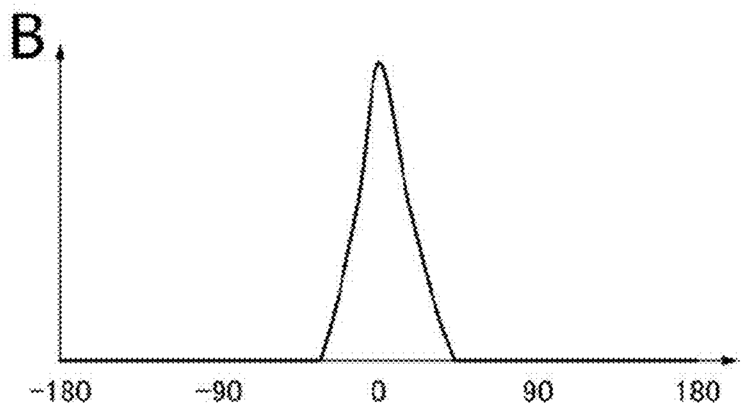
Figure 19C:
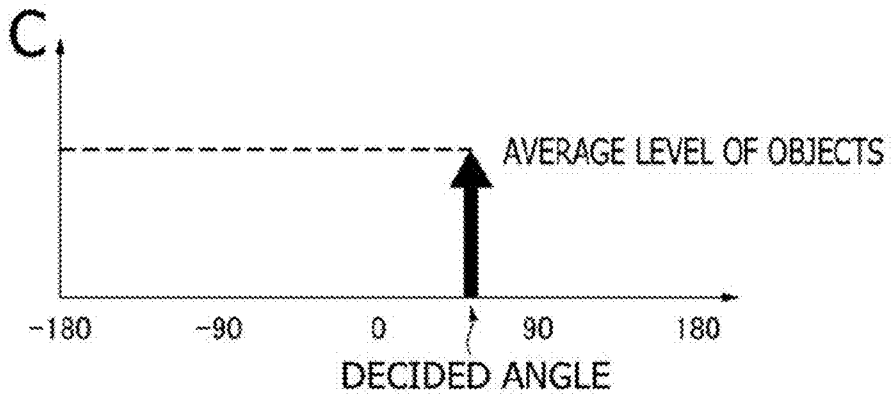
Figure 19D:
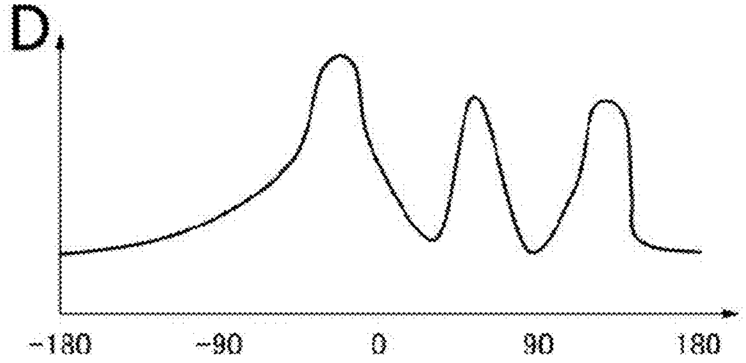

At step ST34, the noise arrival direction information is updated each time a reproduction position of a prescribed audio object is decided. FIG. 19A depicts noise arrival direction information that has not been updated. FIG. 19B depicts one example of a smoothing filter to be convoluted into the noise arrival direction information. For example, it is assumed that an arrangement position of a prescribed audio object is defined at an angle of around 70 degrees as a result of the process regarding the pattern PT2. The average level of audio objects corresponding to this angle is obtained (FIG. 19C). The average level is added to the noise arrival direction information depicted in FIG. 19A (FIG. 19D). The next process uses the updated noise arrival direction information. Accordingly, a change in the noise arrival direction information as a result of re-arrangement of an audio object can be reflected on a process regarding either one of the patterns. Then, the process proceeds to step ST35.

At step ST35, whether there is no more audio objects etc. to be processed left is determined. In a case where there is no more audio objects etc. to be processed, the process is finished.

(Optimal NC Filter Calculating Section)

Figure 20:
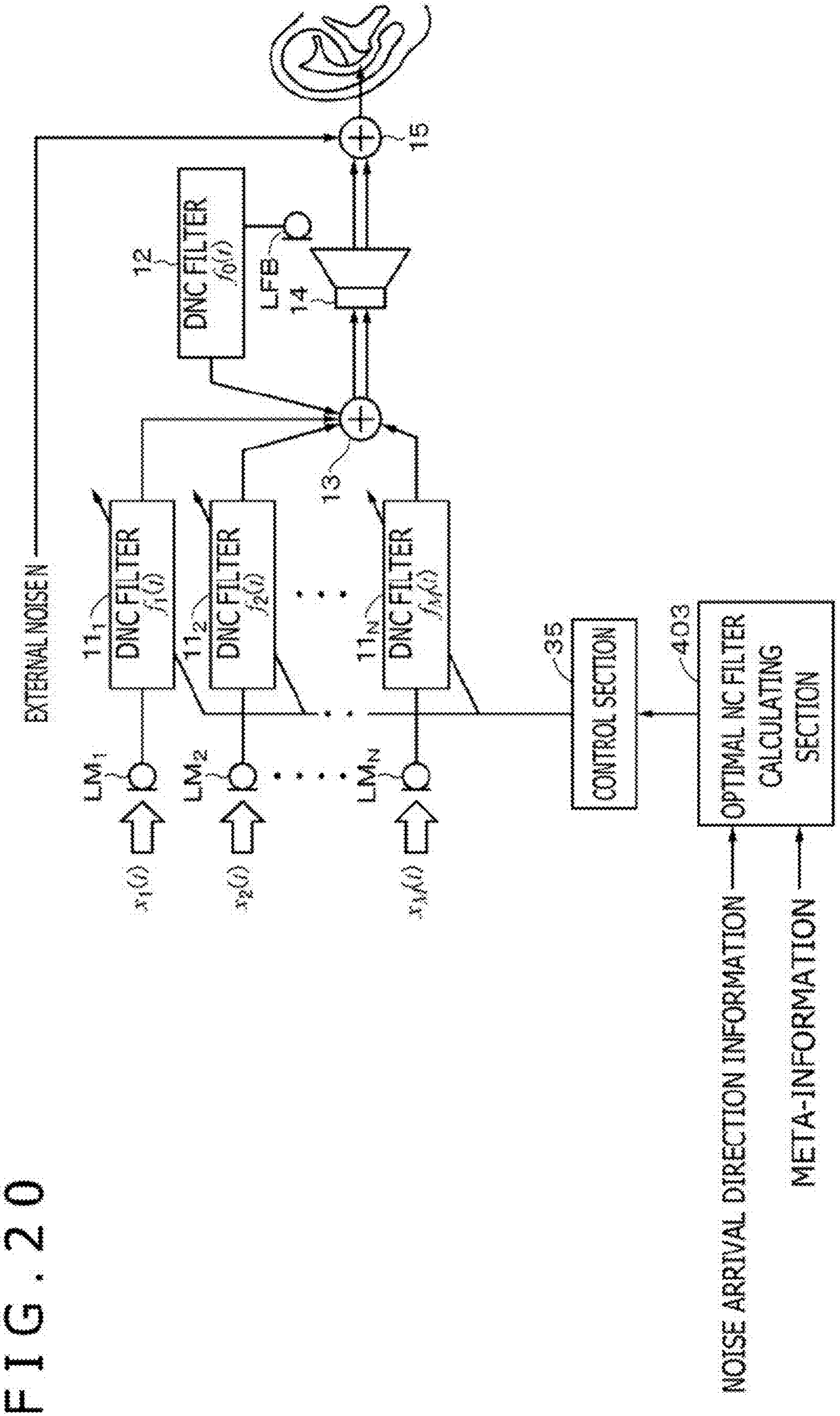
FIG. 20 is a diagram to be referred to when a process that is performed by an optimal NC filter calculating section is explained.

The optimal NC filter calculating section 403 selects an optimal filter coefficient for canceling noise or selects a DNC filter 11 to be operated, by using the noise arrival direction information and the meta information. For example, the optimal NC filter calculating section 403 calculates a DNC filter 11 to be operated, or the noise canceling intensity of each DNC filter 11 on the basis of the noise arrival direction information. Then, the optimal NC filter calculating section 403 generates an optimal control parameter on the basis of the calculation result, as depicted in FIG. 20. The control section 35 sets, for an appropriate DNC filter 11, the control parameter generated by the optimal NC filter calculating section 403. It is to be noted that the DNC filters 11 are depicted in FIG. 20 but the optimal NC filter calculating section 403 performs the similar process on the DNC filters 21.

In a case where a residual noise in a listener's ear is defined as e(t), intra-ear residual noise can be expressed by the following expression (1) (in the expression (1), l(t) represents leakage noise that is previously measured, $x_m(t)$ represents an input to all FFNC microphones, $f_m(t)$ represents a DNC filter characteristic, and d(t) represents an acoustic characteristic in the headset).

[Math. 1]

$$e(t) = \ell(t) - \left(\sum_{m=0}^{M} x_m(t) * f_m(t)\right) * d(t) \tag{1}$$

The optimal NC filter calculating section 403 may calculate control parameters for the DNC filters 11 and 21 in such a way that the intra-ear residual noise in the expression (1) is minimized.

Third Embodiment

Next, a third embodiment will be explained. It is to be noted that, in the explanation of the third embodiment, a section that is identical or similar to that in the above explanation is denoted by the same reference numeral, and a repeated explanation thereof will be omitted, as appropriate. In addition, a matter having been explained in the first or second embodiment may be applied to the third embodiment unless otherwise stated.

In the third embodiment, roughly, a part of the process that is performed in the headset in the first or second embodiment is performed in an external device (e.g. a smartphone or server device that can communicate with the headset).

<Configuration Example of Headset>

Figure 21:
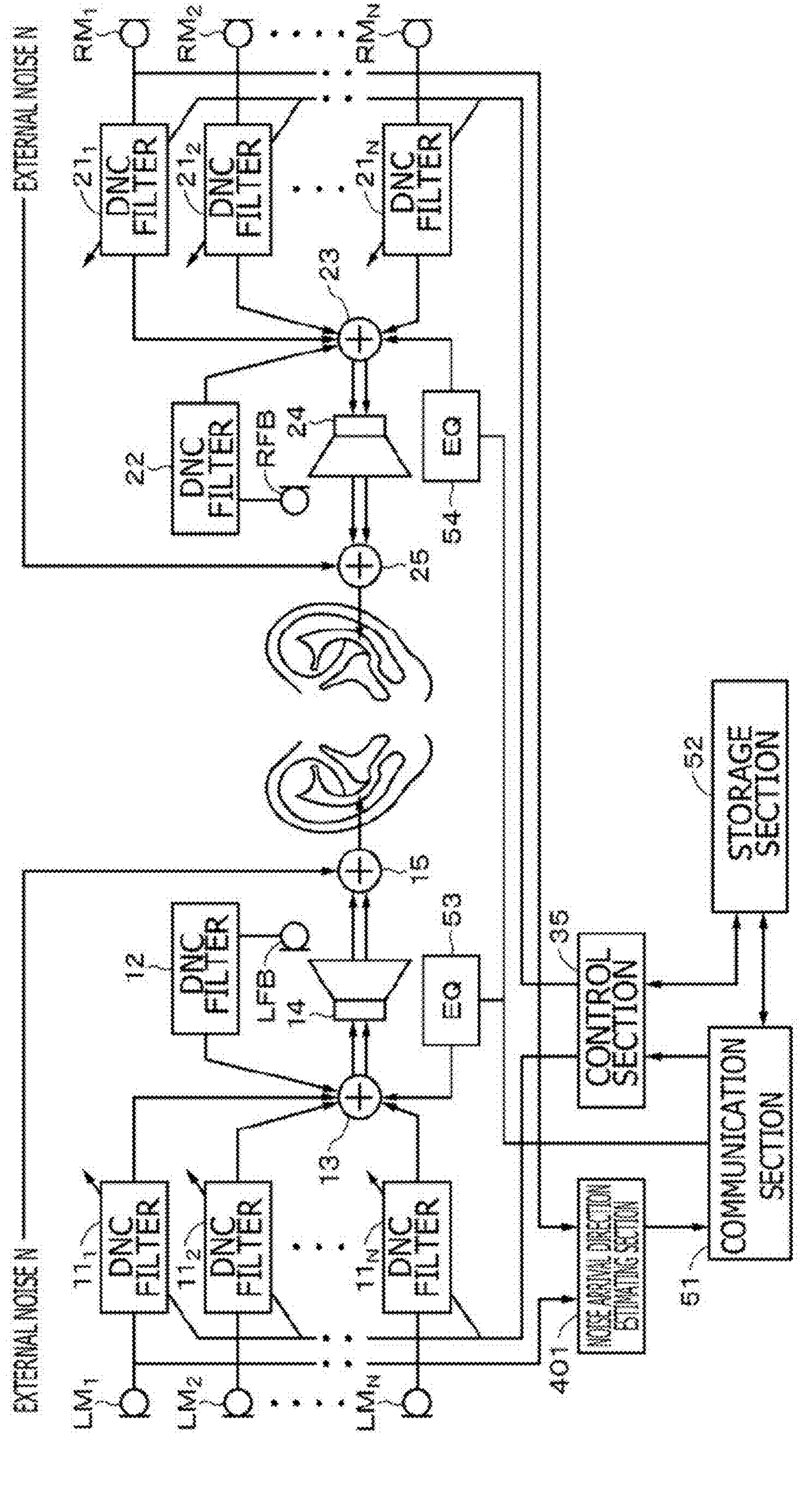
FIG. 21 is a diagram depicting a configuration example of a headset according to a third embodiment.

FIG. 21 is a diagram depicting a configuration example of a headset (headset 1C) according to the third embodiment. The headset 1C includes a communication section 51 and a storage section 52 such as a memory. In addition, the headset 1C includes only the noise arrival direction estimating section 401 of the functional blocks of the analysis section 41. Further, the headset 1C does not include the digital filter 31 or 32. However, the headset 1C includes EQs 53 and 54 that execute the equalizing function of the functions of the digital filters 31 and 32.

The communication section 51 includes an antenna, a modulation-demodulation circuit appropriate for the communication system. It is assumed that wireless communication is performed, but wired communication may be performed. The wireless communication is performed through a LAN (Local Area Network), Bluetooth (registered trademark), Wi-Fi (registered trademark), or a WUSB (Wireless USB), for example. As a result of communication performed by the communication section 51, the headset 1C and an external device such as a smartphone are paired.

<Configuration Example of Smartphone>

Figure 22:
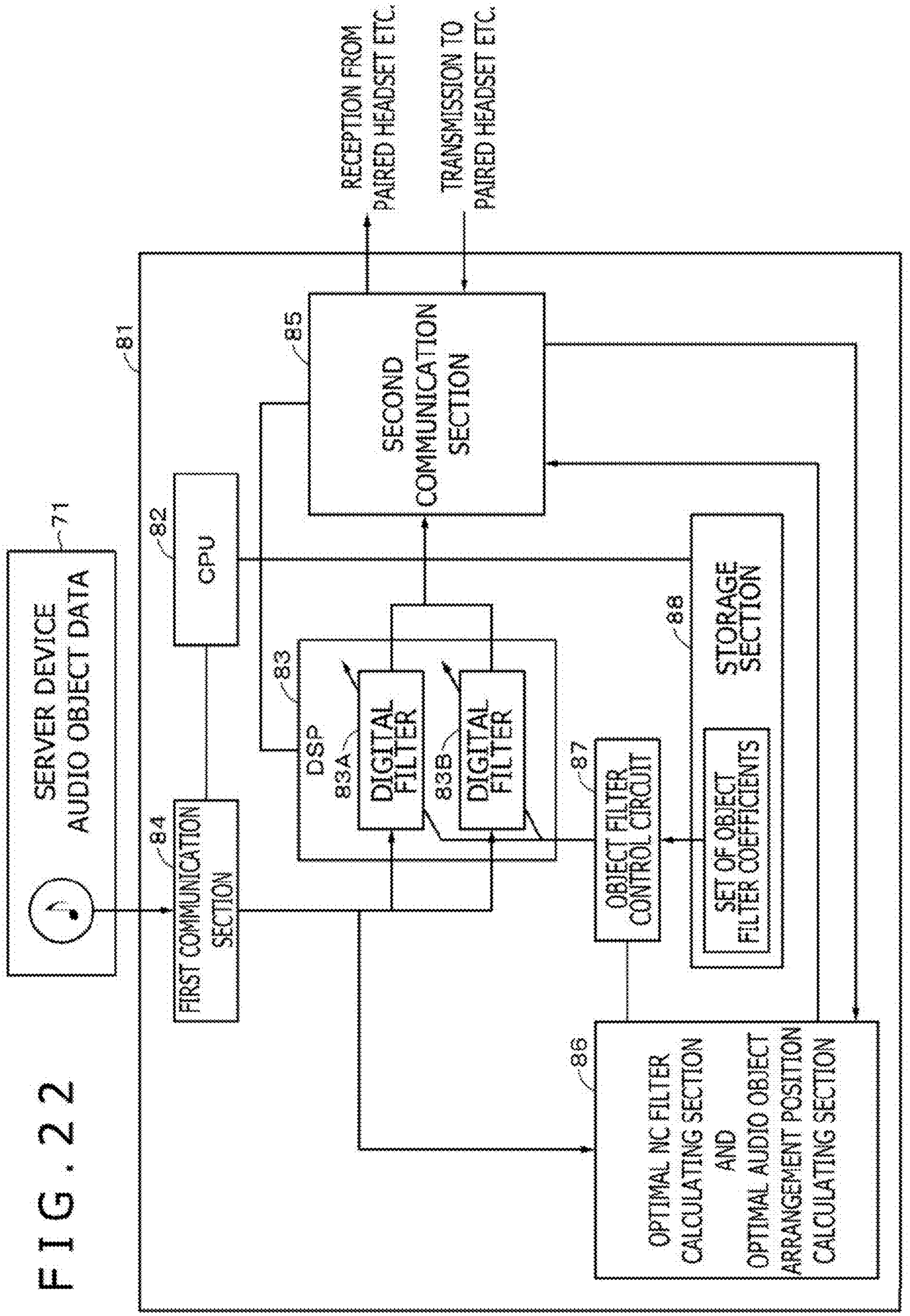
FIG. 22 is a diagram depicting a configuration example of a smartphone according to the third embodiment.

FIG. 22 is a diagram depicting a configuration example of a smartphone 81 which is one example of the external device. The smartphone 81 includes a CPU (Central Processing Unit) 82, a DSP (Digital Signal Processor) 83, a first communication section 84, a second communication section 85, (optimal audio object arrangement position calculating section and optimal NC filter calculating section) 86, an object filter control circuit 87, and a storage section 88. The DSP 83 includes digital filters 83A and 83B.

The CPU 82 generally controls the smartphone 81. The digital filters 83A and 83B of the DSP 83 perform a rendering process of localizing an audio object at a prescribed position, for example.

The first communication section 84 communicates with a server device 71. As a result of this communication, data on an audio object is downloaded from the server device 71 to the smartphone 81.

The second communication section 85 communicates with the communication section 51 of the headset 1C. As a result of this communication, noise arrival direction information is supplied from the headset 1C to the smartphone 81. In addition, an audio object having undergone a process which will be explained later is supplied from the smartphone 81 to the headset 1C.

The (optimal audio object arrangement position calculating section and optimal NC filter calculating section) 86 has the functions of the abovementioned optimal audio object arrangement position calculating section 402 and the function of the abovementioned optimal NC filter calculating section 403.

The object filter control circuit 87 sets, for the digital filters 83A and 83B, filter coefficients for implementing an arrangement position of an audio object calculated by the (optimal audio object arrangement position calculating section and optimal NC filter calculating section) 86.

The storage section 88 stores various types of data. For example, the storage section 88 stores a filter coefficient for implementing an arrangement position of an audio object. The storage section 88 is a magnetic storage device such as an HDD (Hard Disk Drive), a semiconductor storage device, an optical storage device, or a magneto-optical storage device, for example.

<Process that is Performed Between Headset and Smartphone>

Next, a process that is performed between the headset 1C and the smartphone 81 will be performed. First, for example, short-range wireless communication between the headset 1C and the smartphone 81 is performed, whereby the headset 1C and the smartphone 81 are paired.

The headset 1C generates noise arrival direction information, as previously explained in the second embodiment. The noise arrival direction information is supplied from the communication section 51 of the headset 1C to the second communication section 85 of the smartphone 81. The noise arrival direction information is supplied from the second communication section 85 to the (optimal audio object arrangement position calculating section and optimal NC filter calculating section) 86.

By communicating with the server device 71, the first communication section 84 of the smartphone 81 acquires an audio object and meta information corresponding to the audio object from the server device 71. The data on the audio object is supplied to the DSP 83. The meta information is supplied to the (optimal audio object arrangement position calculating section and optimal NC filter calculating section) 86.

The (optimal audio object arrangement position calculating section and optimal NC filter calculating section) 86 decides an arrangement position (sound source direction) of the audio object in the similar manner to that in the second embodiment. The (optimal audio object arrangement position calculating section and optimal NC filter calculating section) 86 supplies the decided sound source direction to the object filter control circuit 87. The object filter control circuit 87 reads out, from the storage section 88, a filter coefficient for implementing the sound source direction, and sets the read coefficient for the digital filters 83A and 83B.

A filter process using the digital filters 83A and 83B is performed on the data on the audio object. The resultant data is transmitted to the headset 1C via the second communication section 85. In addition, optimal control parameters for the DNC filters 11 and 21 calculated by the (optimal audio object arrangement position calculating section and optimal NC filter calculating section) 86 are transmitted to the headset 1C via the second communication section 85.

The data on the audio object received by the communication section 51 of the headset 1C undergoes an equalizing process at the EQ 53, and then, is supplied to the adder section 13. Further, the data on the audio object received by the communication section 51 of the headset 1C undergoes an equalizing process at the EQ 54, and then is supplied to the adder section 23.

Further, the optimal control parameters for the DNC filters 11 and 21 received by the communication section 51 of the headset 1C are supplied to the control section 35, and are respectively set for the DNC filters 11 and 21. The remaining processes are similar to those previously explained in the first or second embodiment.

In the manner explained so far, a part of the headset according to the first or second embodiment may be implemented by an external device such as a smartphone. That is, an acoustic signal processing device according to the present disclosure is not limited to a headset and may be realized by an electronic device such as a smartphone. It is to be noted that which function is implemented by an external device can be changed, as appropriate. For example, in the above third embodiment, the smartphone 81 may have the function of the noise arrival direction estimating section 401 that generates noise arrival direction information.

Modifications

Some of the embodiments according to the present disclosure have been explained above. The present disclosure is not limited to the above embodiments, and various modifications can be made on the basis of the technical concept of the present disclosure.

Arrangement of the abovementioned sections of the headset can be changed in the headset, as appropriate. For example, in a case where on-ear headphones or neckband headphones are used, a circuit configuration including the digital filters, the control section, the analysis section, etc. is installed in either the left or right housing while a data cable connecting both of the housings is formed so as to allow transmission/reception of data to/from the side with no circuit configuration. In addition, in neckband headphones, the circuit may be installed in one of the housings in the abovementioned manner, or the circuit configuration including the digital filters, the control section, the analysis section, etc. may be disposed in the neckband part. Meanwhile, in what is called left-right independent type headphones such as a canal type or an open-ear type, it is desirable that a circuit including the digital filters, the control section, the analysis section, etc. is independently installed on each of the left and right sides, which are not depicted.

The abovementioned DNC filters, digital filters, and the EQ 53 can be formed so as to be included in a DSP. In addition, the control section and the analysis section can be included in a circuit of a DSP or a processor. Alternatively, the control section and the analysis section may be configured to operate in accordance with a computer program (software) that is operated by a DSP or a processor.

The configurations, methods, steps, shapes, materials, and numerical values described in the above embodiments and modifications are just examples. In place of them, any other configurations, methods, steps, shapes, materials, and numerical values may be used, if needed. The configurations, methods, steps, shapes, materials, and numerical values described in the above embodiments and modifications may be replaced by those that are publicly known. In addition, the configurations, methods, steps, shapes, materials, and numerical values described in the above embodiments and modifications can be combined as long as no technical inconsistency occurs.

It is to be noted that the interpretation of the present disclosure should not be limited by the effects described here.

The present technology can also have the following configurations.

(1)

An acoustic signal processing device including:

a noise cancelling section that is provided for each of multiple microphones and that generates a signal for cancelling noise according to a sound signal inputted from the corresponding microphone; and a digital filter that processes an external input signal.

(2)

The acoustic signal processing device according to (1), further including:

a control section that generates a control parameter for the noise cancelling section; and an analysis section that analyzes sound signals inputted from the microphones.

(3)

The acoustic signal processing device according to (2), in which the analysis section has a noise arrival direction estimating section that, according to the sound signals inputted from the microphones, generates noise arrival direction information which indicates an arrival direction of the noise.

(4)

The acoustic signal processing device according to (3), in which the noise cancelling section further generates a control parameter for the digital filter, the analysis section further analyzes the external input signal, and the external input signal includes an audio object and meta information corresponding to the audio object, and the optimal audio object arrangement position calculating section has an optimal audio object reproduction position calculating section that, in accordance with the noise arrival direction information, calculates an optimal reproduction position of the audio object.

(5)

The acoustic signal processing device according to (4), in which the audio object is a single audio object, the meta information includes recommended reproduction position information and change permission/prohibition information which indicates whether a change of a sound source direction is permitted or not, and in a case where the change permission/prohibition information indicates that the change is permitted, a process of reproducing the audio object at the optimal reproduction position is performed, and in a case where the change permission/prohibition information indicates that the change is not permitted, a process of reproducing the audio object at the recommended reproduction position is performed.

(6)

The acoustic signal processing device according to (4), in which the audio object includes multiple audio objects relative reproduction positions of which are defined, and in accordance with the noise arrival direction information, the analysis section calculates the optimal reproduction position in such a way that a noise intensity index with respect to the multiple audio objects is minimized.

(7)

The acoustic signal processing device according to (4), in which the audio object includes multiple audio objects an order of which is defined, in a case where the change permission/prohibition information indicates that the change is permitted, a process of reproducing the audio object at the optimal reproduction position is performed, and in a case where the change permission/prohibition information indicates that the change is not permitted, a process of reproducing the audio object at the recommended reproduction position is performed, and the process is performed in accordance with an order corresponding to the defined order, and the noise arrival direction information is updated each time the process is performed.

(8)

The acoustic signal processing device according to (7), in which the order is randomly decided, is based on a priority level, or is based on a content classification.

(9)

The acoustic signal processing device according to any one of (3) to (8), in which the analysis section generates an optimal control parameter for the noise cancelling section in accordance with the noise arrival direction information.

(10)

The acoustic signal processing device according to any one of (4) to (8), in which the digital filter performs a process of localizing the audio object at a prescribed position.

(11)

The acoustic signal processing device according to any one of (1) to (10), further including:

the multiple microphones.

(12)

The acoustic signal processing device according to (11), in which the multiple microphones include a feedforward microphone and a feedback microphone.

(13)

The acoustic signal processing device according to any one of (1) to (12), in which the external input signal includes audio data supplied wirelessly or wiredly.

(14)

The acoustic signal processing device according to any one of (1) to (13), the acoustic signal processing device being formed as a headset device.

(15)

An acoustic signal processing method including:

generating a signal for canceling noise according to a sound signal inputted from a corresponding one of multiple microphones, by a noise cancelling section that is provided for each of the microphones; and processing an external input signal, by a digital filter.

(16)

A program for causing a computer to perform an acoustic signal processing method including:

generating a signal for canceling noise according to a sound signal inputted from a corresponding one of multiple microphones, by a noise cancelling section that is provided for each of the microphones; and processing an external input signal, by a digital filter.

REFERENCE SIGNS LIST

1A, 1B, 1C: Headset
11, 12, 21, 22: DNC filter
31, 32: Digital filter
35: Control section
41: Analysis section
401: Noise arrival direction estimating section
402: Optimal audio object arrangement position calculating section
403: Optimal NC filter calculating section
LM, RM: Microphone

The invention claimed is:

1. An acoustic signal processing device comprising:

a noise cancelling section that is provided for each of multiple microphones and that generates a signal for cancelling noise according to a sound signal inputted from the corresponding microphone;

a control section that generates a control parameter for the noise cancelling section;

an analysis section that analyzes the sound signals inputted from the microphones; and a digital filter that processes an external input signal received from an outside, wherein the external input signal includes an audio object and meta information corresponding to the audio object, the analysis section analyzing the sound signals inputted from the microphones involves changing noise arrival direction information which is generated according to the sound signals inputted from the microphones, and changing a reproduction position of the audio object in accordance with the meta information, and the control section further generates a control parameter for the digital filter.

2. The acoustic signal processing device according to claim 1, wherein the audio object is a single audio object, the meta information includes reproduction position information and change permission/prohibition information which indicates whether a change of a sound source direction is permitted or not, and in a case where the change permission/prohibition information indicates that the change is permitted, a process of reproducing the audio object at the changed reproduction position is performed, and in a case where the change permission/prohibition information indicates that the change is not permitted, a process of reproducing the audio object at the reproduction position of the meta information is performed.

3. The acoustic signal processing device according to claim 2, wherein the audio object includes multiple audio objects an order of which is defined, in a case where the change permission/prohibition information indicates that the change is permitted, a process of reproducing the audio object at the changed reproduction position is performed, and in a case where the change permission/prohibition information indicates that the change is not permitted, a process of reproducing the audio object at the reproduction position of the meta information is performed, and the process is performed in accordance with an order corresponding to the defined order, and the noise arrival direction information is updated each time the process is performed.

4. The acoustic signal processing device according to claim 3, wherein the order is randomly decided, is based on a priority level, or is based on a content classification.

5. The acoustic signal processing device according to claim 1, wherein the audio object includes multiple audio objects in which a relative sound source direction from a reference object is defined in the meta information, and in accordance with the noise arrival direction information, the analyzing the inputted sound signals changes the reproduction position in such a way that a noise intensity index with respect to the multiple audio objects is minimized.

6. The acoustic signal processing device according to claim 1, wherein the analysis section generates a control parameter for the noise cancelling section in accordance with the noise arrival direction information.

7. The acoustic signal processing device according to claim 1, wherein the digital filter performs a process of localizing the audio object at a prescribed position.

8. The acoustic signal processing device according to claim 1, further comprising:

the multiple microphones.

9. The acoustic signal processing device according to claim 8, wherein the multiple microphones include a feedforward microphone and a feedback microphone.

10. The acoustic signal processing device according to claim 1, wherein the external input signal includes audio data supplied wirelessly or wiredly.

11. The acoustic signal processing device according to claim 1, the acoustic signal processing device being formed as a headset device.

12. An acoustic signal processing method comprising:

generating a signal for canceling noise according to a sound signal inputted from a corresponding one of multiple microphones, by a digital noise cancelling filter that is provided for each of the multiple microphones;

generating a control parameter for the noise canceling filter and analyzing the sound signals inputted from the microphones, by a processor; and processing an external input signal inputted from an outside, by a digital filter, wherein the external input signal includes an audio object and meta information corresponding to the audio object, and the processor further changes a reproduction position of the audio object in accordance with the meta information and noise arrival direction information which is generated according to the sound signals inputted from the microphones, and generates a control parameter for the digital filter.

13. A non-transitory computer-readable medium storing a program that, when processed by a processor of a computer, causes the computer to execute an acoustic signal processing method, comprising:

generating a signal for canceling noise according to a sound signal inputted from a corresponding one of multiple microphones, by a digital noise cancelling filter that is provided for each of the multiple microphones;

generating a control parameter for the noise canceling filter and analyzing the sound signals inputted from the microphones, by a processor; and processing an external input signal inputted from an outside, by a digital filter, wherein the external input signal includes an audio object and meta information corresponding to the audio object, and the processor further changes a reproduction position of the audio object in accordance with the meta information and noise arrival direction information which is generated according to the sound signals inputted from the microphones, and generates a control parameter for the digital filter.

* * * * *